United States Patent
Kamiura et al.

(10) Patent No.: US 10,090,717 B2
(45) Date of Patent: Oct. 2, 2018

(54) POWER RECEIVING DEVICE AND POWER FEEDING DEVICE

(71) Applicant: TDK CORPORATION, Tokyo (JP)

(72) Inventors: Naoko Kamiura, Tokyo (JP); Kaoru Matsuoka, Tokyo (JP); Takashi Urano, Tokyo (JP)

(73) Assignee: TDK CORPORATION, Tokyo (JP)

(*) Notice: Subject to any disclaimer, the term of this patent is extended or adjusted under 35 U.S.C. 154(b) by 260 days.

(21) Appl. No.: 14/507,307

(22) Filed: Oct. 6, 2014

(65) Prior Publication Data

US 2015/0097444 A1    Apr. 9, 2015

(30) Foreign Application Priority Data

Oct. 4, 2013 (JP) .................................. 2013-208678
Aug. 20, 2014 (JP) .................................. 2014-167457

(51) Int. Cl.
*H02J 50/40* (2016.01)
*H01F 38/14* (2006.01)
(Continued)

(52) U.S. Cl.
CPC .......... *H02J 50/40* (2016.02); *H01F 27/2823* (2013.01); *H01F 38/14* (2013.01);
(Continued)

(58) Field of Classification Search
CPC .................................. H02J 5/005; H02J 17/00
(Continued)

(56) References Cited

U.S. PATENT DOCUMENTS 5,070,293 A * 12/1991 Ishii .................... G06K 7/10881
                                                                  320/108
2005/0068009 A1    3/2005 Aoki
(Continued)

FOREIGN PATENT DOCUMENTS

JP    2001-297310 A    10/2001
JP    2005-110399 A    4/2005
(Continued)

OTHER PUBLICATIONS

Mar. 13, 2015 Extended Search Report issued in European Patent Application No. 14187540.1.

*Primary Examiner* — Daniel Kessie
(74) *Attorney, Agent, or Firm* — Oliff PLC

(57) ABSTRACT

A power receiving device and power feeding device improve convenience of the user by increasing the freedom of configuring the power receiving device with respect to the power feeding device and freedom of configuring the power feeding device with respect to the power receiving device, and inhibit large size of machines. The power receiving device includes: plurality of surfaces; and inside a power receiving coil, and the power receiving coil includes: a winding portion with wires wound; and an opening portion surrounded by the winding portion and having two opposite opening ends. By disposing the power receiving coil so an end face of at least one of the two opening ends is nonparallel (excluding perpendicular) to two or more surfaces of the power receiving device, a power receiving area capable of receiving power from the power feeding device formed on the two or more surfaces of the power receiving device.

6 Claims, 17 Drawing Sheets

(51) Int. Cl.
  *H02J 7/02* (2016.01)
  *H04B 5/00* (2006.01)
  *H02J 50/10* (2016.01)
  *H02J 50/05* (2016.01)
  *H01F 27/28* (2006.01)
  *B60L 11/18* (2006.01)

(52) U.S. Cl.
  CPC .............. *H02J 7/025* (2013.01); *H02J 50/05* (2016.02); *H02J 50/10* (2016.02); *H04B 5/0037* (2013.01); *H04B 5/0075* (2013.01); *B60L 11/182* (2013.01); *Y02T 10/7072* (2013.01); *Y02T 90/122* (2013.01); *Y02T 90/14* (2013.01)

(58) Field of Classification Search
  USPC .......................................................... 307/104
  See application file for complete search history.

(56) References Cited

U.S. PATENT DOCUMENTS

| 2009/0267559 | A1 | 10/2009 | Toya et al. |
| 2012/0119699 | A1 | 5/2012 | Carbunaru et al. |
| 2012/0212069 | A1 | 8/2012 | Kawano et al. |
| 2013/0002035 | A1* | 1/2013 | Oodachi ................. H02J 5/005 307/104 |
| 2013/0127253 | A1* | 5/2013 | Stark .................... A61N 1/3787 307/104 |
| 2013/0234530 | A1* | 9/2013 | Miyauchi ............... H02J 5/005 307/104 |
| 2015/0077053 | A1* | 3/2015 | Stamenic .............. H02J 7/0042 320/109 |

FOREIGN PATENT DOCUMENTS

| JP | 2009-268248 A | 11/2009 |
| JP | 2010-080851 A | 4/2010 |
| JP | 2010-193701 A | 9/2010 |
| JP | 2012-029510 A | 2/2012 |
| JP | 2012-80636 A | 4/2012 |
| JP | 2012-0174727 A | 9/2012 |
| JP | 2014-087125 A | 5/2014 |
| WO | 00/66221 A1 | 11/2000 |
| WO | 2010/122389 A1 | 10/2010 |
| WO | 2013/039501 A1 | 3/2013 |

* cited by examiner

POWER RECEIVING DEVICE AND POWER FEEDING DEVICE

FIELD OF THE INVENTION

The present invention relates to a power receiving device and a power feeding device.

BACKGROUND

Technology that transmits power without a power line, so-called wireless power transmission technology, has attracted attention. The wireless power transmission technology can transmit power from power feeding device to power receiving device with no contact. So it is expected to be applicable in transporting machines such as trains and electric vehicles, household appliances, electronic devices, wireless communication devices, toys and the like products.

In the wireless power transmission device, the primary coil constituting the power feeding portion of the power feeding device and the secondary coil constituting the power receiving portion of the power receiving device are opposite to each other to supply power from power feeding device to power receiving device. The primary coil and the secondary coil are mostly configured at specific portions of the power feeding device and the power receiving device, and the specific portions of the power feeding device and the power receiving device need to be opposite to each other when charging the power receiving device.

From the viewpoint of configuration of the power receiving device, Patent Document 1 discloses a power feeding system in which a plurality of power feeding side coils and power receiving side coils are provided on the power feeding device and the power receiving device, respectively, such that the user can optionally configure these devices regardless of the positional relation between the power feeding device and the power receiving device. In the aforementioned power feeding system, the circuit of the output signal is arranged such that the power feeding side coil and the power receiving side coil are operated at the highest transmission efficiency among the plurality of power feeding side coils and power receiving side coils.

Furthermore, from the viewpoint of power transmission efficiency, Patent Document 2 discloses a portable device and a bottom surface-curved charger in which a curved induction coil is built-in and the portable device is back surface-curved to follow the shape of the induction coil so that the power can be easily carried from the charger to the portable device.

PATENT DOCUMENTS

Patent Document 1: Japanese Patent Application Laid-Open Publication No. 2005-110399
Patent Document 2: Japanese Patent Application Laid-Open Publication No. 2009-268248

SUMMARY

However, in the power feeding system described in Patent Document 1, in a case where the power feeding and power receiving assembly is formed by using a plurality of power feeding side coils and power receiving side coils, there are problems such as complex circuit, large-sized machine, required cost due to increase of numbers of wirings and control devices.

Furthermore, although the portable device and charger described in Patent Document 2 can inhibit positional offset between an induction coil on the portable device side and a source coil on the charger side, the portable device cannot be charged if a surface other than the surface opposite to the induction coil in the portable device faces the charger, thereby limiting the configuration of the portable device.

Therefore, the object of the present invention is to provide a power receiving device and a power feeding device, which improve convenience of the user by increasing the freedom of configuring the power receiving device with respect to the power feeding device and the freedom of configuring the power feeding device with respect to the power receiving device, and inhibit large size of machines.

The present invention provides a power receiving device to which power is transmitted wirelessly from a power feeding device comprising a power feeding coil, the power receiving device comprising: a plurality of surfaces; and inside a power receiving coil, and the power receiving coil comprising: a winding portion with wires wound; and an opening portion surrounded by the winding portion and having two opposite opening ends, and being disposed so that an end face of at least one of the two opening ends is nonparallel (excluding perpendicular) to two or more surfaces of the power receiving device, and a power receiving area capable of receiving power from the power feeding device being formed on two or more surfaces of the power receiving device.

By the above configuration, the power receiving device of the present invention can allow magnetic flux to interlink through two or more surfaces with respect to one power receiving coil. Therefore, the wirings for connecting the power receiving coils can be simplified and the number of the control devices can be decreased as compared with a case where one surface of the power receiving device is the surface for receiving power with respect to one power receiving coil, and where a plurality of surfaces of the power receiving device are the surfaces for receiving power by using a plurality of power receiving coils. Furthermore, even when the power feeding area of the power feeding device is a specific portion, the power receiving device can have freedom for configuration to transmit power.

Herein, the power receiving coil can also be a planar coil. By configuring the power receiving coil as a planar coil, the magnetic flux generated by the power feeding coil comprised in the power feeding device interlinks though any one surface of the power receiving device on which the power receiving area is formed in a manner of passing through the plane of the power receiving coil. As such, since electricity is generated in a manner of flowing into the planar power receiving coil in only one direction, the power receiving coil can efficiently obtain electricity through magnetic flux generated by the power feeding coil and can receive power from the power feeding device with improved power transmission efficiency, in a case of supplying power to the power receiving device through any one surface of the power receiving device on which the power receiving area is formed.

Furthermore, the power receiving coil can be curved or bent; and includes a protruding portion projecting toward the opposite side of one or more surfaces, on which the power feeding device is to be disposed, of the plurality of the surfaces of the power receiving device, or includes a protruding portion projecting toward one or more surfaces, on which the power feeding device is to be disposed, of the plurality of the surfaces of the power receiving device.

With the power receiving coil being curved or bent, the relative positional relation between two or more surfaces of the power receiving device on which the power receiving area is formed and the power receiving coil varies according to the surface of the power receiving device. In such a power receiving device, the magnetic flux interlinked with the power receiving coil according to the surface of the power receiving device is changed, and by changing the surface of the power receiving device opposite to the power feeding device, the electric energy received from the power feeding device can be changed.

Further, with the power receiving device including a protruding portion projecting toward the opposite side of one or more surfaces, on which the power feeding device is to be disposed, of the plurality of the surfaces of the power receiving device, or including a protruding portion projecting toward one or more surfaces, on which the power feeding device is to be disposed, of the plurality of the surfaces of the power receiving device, the magnetic flux generated by the power feeding coil interlinks in a manner of passing through the curved or bent surface of the power receiving coil. As such, since electricity is generated in a manner of flowing into the curved or bent power receiving coil only in one direction, the power receiving device has a surface which can efficiently obtain electricity by magnetic flux generated by the power feeding coil. Therefore, a power receiving device having high power transmission efficiency can be obtained.

Furthermore, regarding the configuration of the power receiving coil in the present invention, although "including a protruding portion projecting toward the opposite side of one or more surfaces on which the power feeding device is to be disposed", or "including a protruding portion projecting toward one or more surfaces on which the power feeding device is to be disposed" is defined, the protruding portion not only protrudes toward the opposite side of or protrudes toward one or more surfaces on which the power feeding device is to be disposed, but also protrudes toward the opposite side of or protrudes toward the boundary portion between one or more surfaces on which the power feeding device is to be disposed and a surface which the power feeding device is not to be disposed on and which is adjacent to the one or more surfaces.

Further, the power receiving coil can be curved or bent, and includes a protruding portion projecting toward the opposite side of one or more surfaces, on which the power feeding device is to be disposed, of the plurality of the surfaces of the power receiving device.

With the power receiving coil being curved or bent, the relative positional relation between two or more surfaces of the power receiving device on which the power receiving area is formed and the power receiving coil varies according to the surface of the power receiving device. In such a power receiving device, the magnetic flux interlinked with the power receiving coil according to the surface of the power receiving device is changed, and by changing the surface of the power receiving device opposite to the power feeding device, the electric energy received from the power feeding device can be changed.

Further, the magnetic flux generated by the power feeding coil comprised in the power feeding device tends to be dense from the central portion toward the winding portion at the opening portion of the power feeding coil. Moreover, among the magnetic flux from the power feeding coil toward the power receiving coil, the magnetic flux generated from the portion except the central portion of the power feeding coil has a vector in a direction extending toward the outside of the power receiving coil. As such, in a case where the power receiving device and the power feeding device are configured in such a manner that the power receiving coil including the above configuration and the power feeding coil comprised in the power feeding device are opposite to each other, the magnetic flux generated by the power feeding coil easily interlinks with the power receiving coil. As such, the power receiving device includes a surface which can receive the magnetic flux generated by the power feeding coil more efficiently, and further, a power receiving device having high power transmission efficiency can be obtained.

Furthermore, the present invention provides a power feeding device which transmits power wirelessly to a power receiving device comprising a power receiving coil, the power feeding device comprising: a plurality of surfaces; and inside a power feeding coil, the power feeding coil comprising: a winding portion with wires wound; and an opening portion surrounded by the winding portion and having two opposite opening end, and being disposed so that an end face of at least one of the two opening ends is nonparallel (excluding perpendicular) to two or more surfaces of the power feeding device, and a power feeding area capable of transmitting power to the power receiving device being formed on two or more surfaces of the power feeding device.

By the above configuration, the power feeding device of the present invention can allow magnetic flux to interlink through two or more surfaces with respect to one power feeding coil. Therefore, the wirings for connecting the power feeding coils can be simplified and the number of the control devices can be decreased as compared with the case where one surface of the power feeding device is the surface for supplying power with respect to one power feeding coil, and where a plurality of surfaces of the power feeding device are the surfaces for supplying power by using a plurality of power feeding coils. Furthermore, even when the power receiving area of the power receiving device is a specific portion, the power feeding device can have freedom for configuration to transmit power.

Herein, the power feeding coil can also be a planar coil. By configuring the power feeding coil as a planar coil, the magnetic flux generated is not counteracted. As such, power can be transmitted into the power receiving device in a state where the magnitude of the magnetic flux is not reduced in the power feeding coil.

Furthermore, the power feeding coil can be curved or bent; and includes a protruding portion projecting toward one or more surfaces, on which the power receiving device is to be disposed, of the plurality of the surfaces of the power feeding device, or includes a protruding portion projecting toward the opposite side of one or more surfaces, on which the power receiving device is to be disposed, of the plurality of the surfaces of the power feeding device.

With the power feeding coil being curved or bent, the relative positional relation between two or more surfaces of the power feeding device on which the power feeding area is formed and the power feeding coil varies according to the surface of the power feeding device. In such a power feeding device, the magnetic flux in a surface of the power feeding device, on which the power feeding area is formed, is changed according to the surface of the power feeding device, and by changing the surface of the power feeding device opposite to the power receiving device, the electric energy transmitted to the power receiving device can be changed.

Further, with the power feeding coil being curved or bent and including a protruding portion projecting toward one or more surfaces, on which the power receiving device is to be disposed, of the plurality of the surfaces of the power feeding device, or including a protruding portion projecting toward the opposite side of one or more surfaces, on which the power receiving device is to be disposed, of the plurality of the surfaces of the power feeding device, most of the magnetic flux generated by the power feeding coil contributes to power supply. As such, the power feeding device includes a surface which can transmit the magnetic flux generated by the power feeding coil efficiently, and a power feeding device having high power transmission efficiency can be obtained.

Furthermore, regarding the configuration of the power feeding coil in the present invention, although "including a protruding portion projecting toward one or more surfaces on which the power receiving device is to be disposed", or "including a protruding portion projecting toward the opposite side of one or more surfaces on which the power receiving device is to be disposed" is defined, the protruding portion not only protrudes toward or protrudes toward the opposite side of one or more surfaces on which the power receiving device is to be disposed, but also protrudes toward or protrudes toward the opposite side of the boundary portion between one or more surfaces on which the power receiving device is to be disposed and a surface which the power receiving device is not to be disposed on and which is adjacent to the one or more surfaces.

Further, the power feeding coil can be curved or bent; and includes a protruding portion projecting toward one or more surfaces, on which the power receiving device is to be disposed, of the plurality of the surfaces of the power feeding device.

With the power feeding coil being curved or bent, the relative positional relation between two or more surfaces of the power feeding device on which the power feeding area is formed and the power feeding coil varies according to the surface of the power feeding device. In such a power feeding device, the magnetic flux in a surface of the power feeding device, on which the power feeding area is formed, varies according to the surface of the power feeding device, and by changing the surface of the power feeding device opposite to the power receiving device, the electric energy transmitted to the power receiving device can be changed.

Moreover, since the magnetic flux is generated in a perpendicular direction with respect to the curved or bent surface of the power feeding coil, with the power feeding coil including the above configuration, the magnetic flux generated inside the power feeding coil is not counteracted with each other. As such, power can be transmitted into the power receiving device in a state where the magnitude of the magnetic flux is not reduced in the power feeding coil, and the power feeding device includes a surface which can transmits the magnetic flux generated by the power feeding coil into the power receiving device more efficiently. As such, a power feeding device having high power transmission efficiency can be obtained.

According to the present invention, a power receiving device and a power feeding device are provided, which improve convenience of the user by increasing the freedom of configuring the power receiving device with respect to the power feeding device and the freedom of configuring the power feeding device with respect to the power receiving device, and inhibit large size of machines.

DETAILED DESCRIPTION OF EMBODIMENTS

Hereinafter, the preferred embodiments of the present invention are described in detail with reference to the drawings. However, the present invention is not limited to the following embodiments. Moreover, the same symbol is designated for the same or corresponding portion in the following description, repeated illustration of which is omitted.

Power Receiving Device

The First Embodiment

Figure 1:
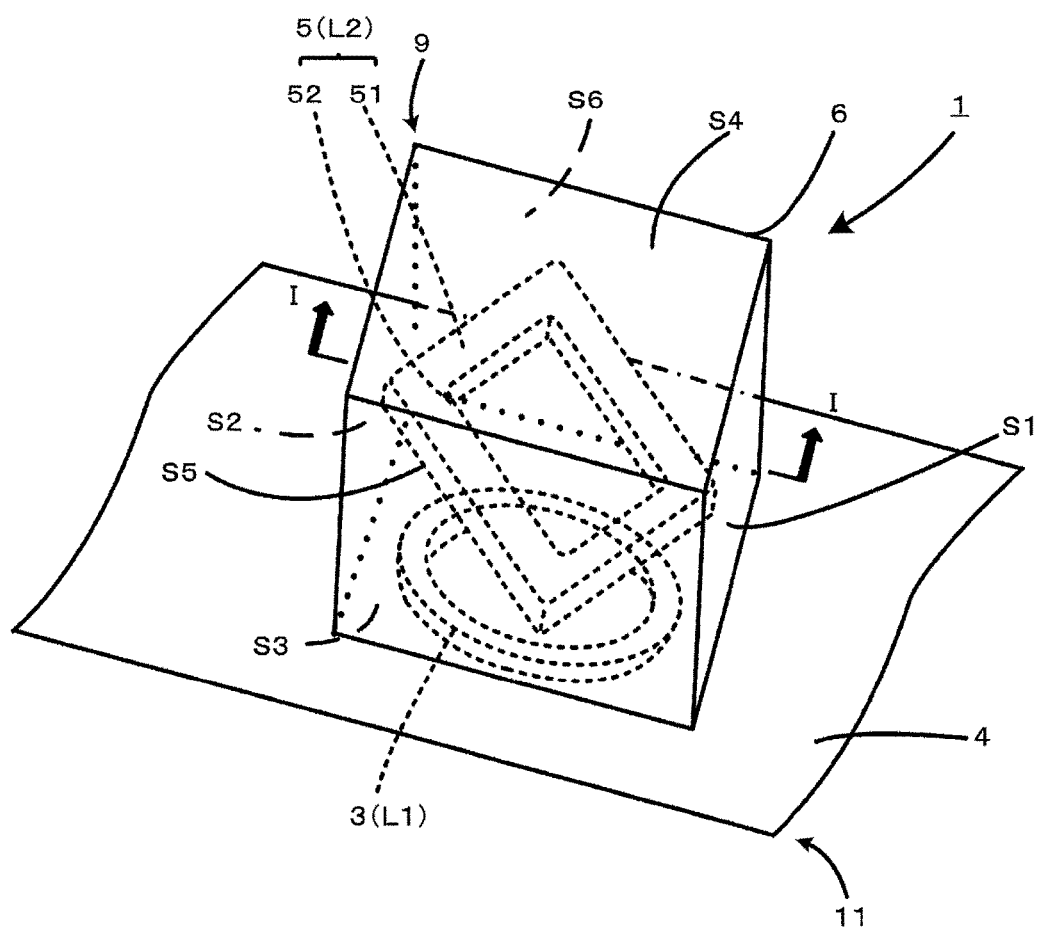
FIG. 1 is a perspective view illustrating a wireless power transmission device of the first embodiment comprising the power receiving device of the present invention.
Figure 2:
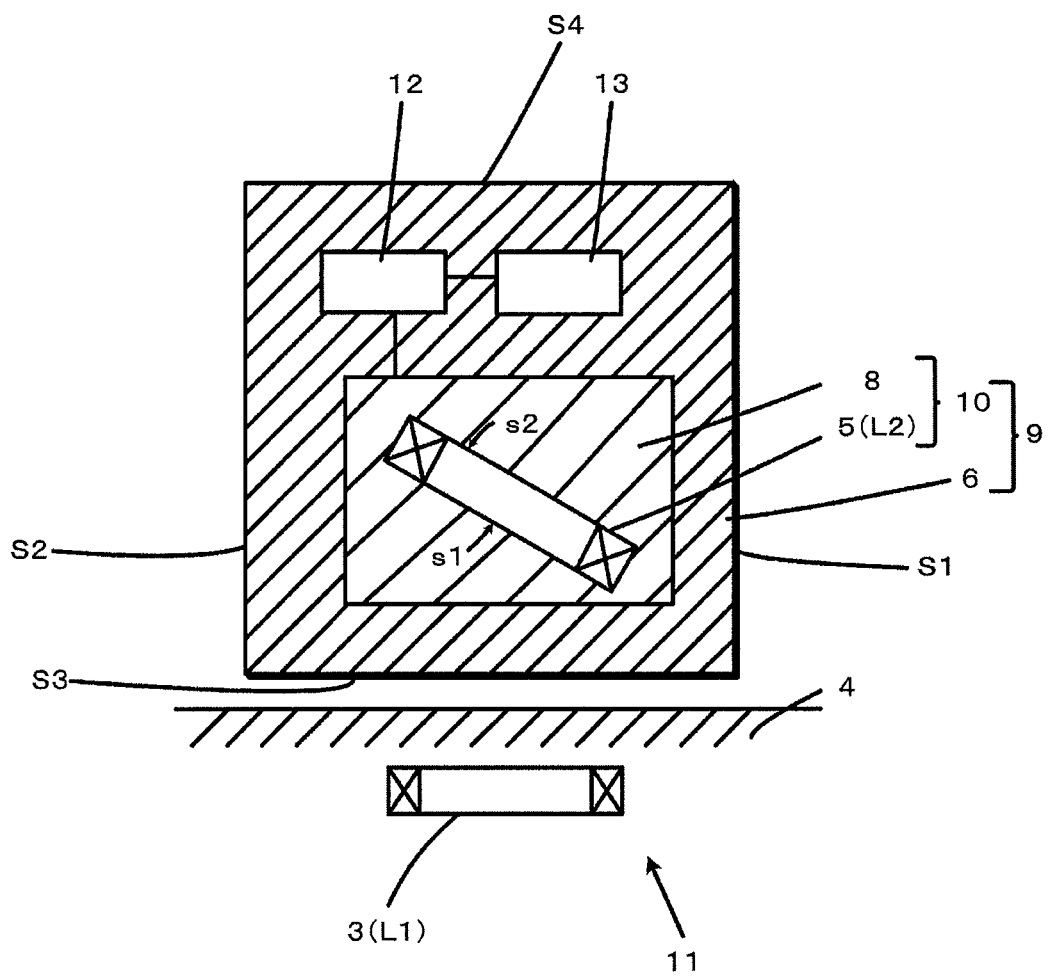
FIG. 2 is a cross-sectional view along the cutting line of I-I of the wireless power transmission device of the first embodiment.

FIG. 1 is a perspective view illustrating a wireless power transmission device of the first embodiment comprising the power receiving device of the present invention, and FIG. 2 is a cross-sectional view along the cutting line of I-I of the wireless power transmission device of the first embodiment. The wireless power transmission device 1 of the first embodiment illustrated in FIG. 1 and FIG. 2 includes the power receiving device 9 of the present invention and the power feeding device 11. The power receiving device 9 includes: a power receiving device body portion 6; a power receiving portion 5 provided inside the power receiving device body portion 6 and receiving the magnetic field to generate electricity; a rectifier 12 that converts alternating current generated in the power receiving portion 5 into direct current; and a load device 13 such as a battery or LED that stores or consumes the direct current converted by the rectifier 12. The power feeding device 11 includes: a power feeding device body portion 4; a battery (not illustrated) that is provided inside the power feeding device body portion 4 and stores direct current; a drive circuit (not illustrated) that converts the direct current received by the battery into alternating current; and a power feeding portion 3 that generates magnetic field by using the alternating current converted by the drive circuit. The power receiving portion 5 is composed of a power receiving coil L2, and the power feeding portion is composed of a power feeding coil L1. By electromagnetically coupling the power receiving coil L2 and the power feeding coil L1, electricity from the power feeding device 11 is wirelessly transmitted to the power receiving device 9.

Figure 3:
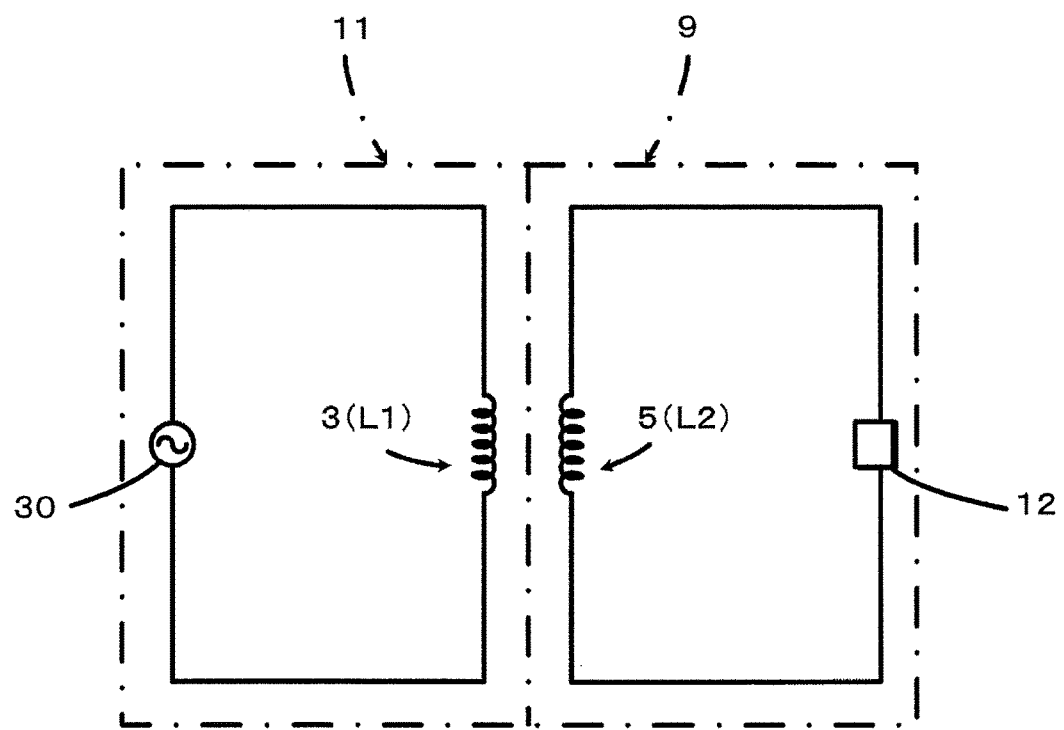
FIG. 3 is a schematic view illustrating an example of the coupling manner of the power feeding portion and the power receiving portion.

FIG. 3 is a schematic diagram illustrating an example of the coupling manner of the power feeding portion and the power receiving portion. In the power feeding device 11, by flowing electricity from an alternating current power source 30 (corresponding to the above battery and drive circuit) into the power feeding coil L1, a magnetic field is generated throughout a region from interior to periphery of the power feeding coil L1. The power receiving device 9 is configured adjacent with the power feeding device 11 in such a manner that the power receiving coil L2 and the power feeding coil L1 are opposite to each other. Through the magnetic field generated by the power feeding coil L1, electricity flows into the power receiving coil L2. By rectifying the generated electricity via the rectifier 12, the electricity is thus supplied to the power receiving device 9. The intensity of the magnetic field generated by the power feeding coil L1 varies with the amount of the electricity flowed into the power feeding coil L1, size and winding numbers of the power feeding coil L1. Moreover, the intensity of the magnetic field or amount of the electricity resulted from the power receiving coil L2 varies with the intensity of the magnetic field generated by the power feeding coil L1, size and winding number of the power receiving coil L2. The above parameters such as electricity flowed into the power feeding coil L1 is adjusted to supply an appropriate amount of power to the power receiving device 9.

As illustrated in FIG. 1 and FIG. 2, the power receiving device 9 is a rectangular parallelepiped having six surfaces, S1, S2, S3, S4, S5 and S6. The power receiving device 9 includes a power receiving device body portion 6 and a power receiving portion package 10 that packages the power receiving coil L2 via resin or the like. The power receiving portion package 10 has an outer shape of rectangular parallelepiped, and is positioned inside the power receiving device body portion 6. The power receiving device body portion 6 has an outer shape corresponding to that of the power receiving device 9.

In the present embodiment, the power receiving coil L2 is a planar coil. The power receiving coil L2 comprises: a winding portion 51 with wires wound; an opening portion 52 surrounded by the winding portion 51 and having two opposite opening ends. Specifically, the power receiving coil L2 is constructed by taking two opposite power receiving faces, formed from the opening end of the opening portion 52 and the surfaces of the winding portion 51 surrounding the opening end, as the main surfaces. If the magnetic flux interlinks with the power receiving coil L2, electricity is generated in the winding portion 51. More specifically, if the opening portion 52 is provided in e.g., central portion of the power receiving coil L2 and the magnetic flux interlinks with the opening portion 52, electricity is generated in the winding portion 51.

As to the phenomenon of generating electricity in the winding portion 51, the magnetic flux that interlinks with the opening portion 52 particularly has a large influence, and thus as described hereafter in detail, an end face of at least one of the two opening ends of the opening portion 52 is configured nonparallel (but not including perpendicular) to two or more surfaces of the power receiving device 9. As such, a power receiving area capable of receiving power from the power feeding device 11 is formed on the two or more surfaces of the power receiving device 9.

The power receiving coil L2 can particularly preferably use a planar coil in which length from an end face of one opening end (an end face s1 of the first opening end) to an end face of the other opening end (an end face s2 of the second opening end) is shorter than the sides that form the power receiving face. The power receiving coil L2 is for example, a planar coil formed from a single layer of winding wires, a planar coil formed from winding wires laminated in a vertical direction, or a planar coil combining these shapes.

In FIG. 2, the magnetic flux generated in the power feeding coil L1 is directed at the power receiving coil L2. With the power receiving coil L2 being a planar coil, if the power receiving device 9 and the power feeding device 11 are configured in such a manner that the power feeding coil L1 and the power receiving coil L2 are opposite to each other, the magnetic flux generated by the power feeding coil L1 comprised in the power feeding device 11 interlinks in a manner of passing through the plane of the power receiving coil L2. As such, electricity is generated in a manner of flowing into the planar power receiving coil L2 in only one direction. As such, the power receiving device 9 receives power from the power feeding device in a state of sufficiently maintaining the power transmission efficiency through any one surface on which the power receiving area is formed as described later.

In the power receiving coil L2, at least one of the end face s1 of the first opening end and the end face s2 of the second opening end is configured nonparallel (but not including perpendicular) to two or more surfaces (six surfaces, S1, S2, S3, S4, S5 and S6 in the present embodiment) of the plurality of surfaces of the power receiving device 9. As such, the two or more surfaces (five surfaces S1, S2, S3, S5 and S6 if only considering the positions of the rectifier 12 and the load device 13 in the present embodiment) of the power receiving device 9 are formed with a power receiving area capable of receiving power from the power feeding device 11. Herein, the "power receiving area" formed on the two or more surfaces of the power receiving device 9 is "an area through which magnetic flux generated by the power feeding coil L1 and interlinking with the power receiving coil L2 passes". If the power receiving device 9 and the power feeding device 11 is to be configured in such a manner that the power feeding coil L1 and the power receiving coil L2 are opposite to each other, electromagnetic induction occurs between the power feeding coil L1 and the power receiving coil L2, and the electricity transmits from the power feeding device 11 to the power receiving device 9 via the power receiving area formed on the surface S3 of the power receiving device 9. In the power receiving device 9, since the surfaces S1, S2, S5 and S6 are also formed with a power receiving area, the electricity can be supplied to the power receiving device 9 via the surfaces S1, S2, S5 and S6, in addition to S3.

From the viewpoint of the efficiency of transmitting power from the power feeding device 11 to the power receiving device 9, the end face s1 of the first opening end and the end face s2 of the second opening end may have an angle titling to be larger than 0° but smaller than 90° with respect to the surface most suitable for the power receiving device 9 to receive power (the surface that has the largest power receiving area, the surface that can be contacted in the most stable state with respect to the surface of the power feeding device, and the like), preferably an angle tilting to be larger than 0° but smaller than 45°. From the viewpoint of reducing fluctuation of power transmission efficiencies on various surfaces, the angle formed is preferably 30° or larger but 60° or smaller, further preferably 35° or larger but 55° or smaller, more preferably 40° or larger but 50° or smaller.

According to the power receiving device 9 of the present embodiment, a plurality of surfaces can be used to receive power without using a plurality of coils, thereby allowing the power receiving device 9 to have freedom for configuration when receiving power. When using one power receiving coil L2 and forming a power receiving area on two or more surfaces of the power receiving device 9, in order to increase the coupling coefficient of the power feeding coil L1 and the power receiving coil L2 and reduce unwanted radiation to the outside, the average distance from the surface of the power receiving device 9 on which a power receiving area is formed to the end face s1 of the first opening end is preferably short.

In the present embodiment, since the number of the power receiving coil L2 is one, the number of the wirings leaded out from the coils, the number of the control devices connecting to the wirings, etc. can be reduced and the size of the power receiving device 9 is non-limited as compared with a case of using a plurality of coils in order to supply power from a plurality of surfaces. The coils are not limited to one in number, and a plurality of coils can further allow the power receiving device 9 to have freedom for configuration to supply power.

In the present embodiment, although the power receiving coil L2 is a planar coil, a part of the winding portion 51 can also comprises a curved portion or a tilt portion as long as at least one of the end face s1 of the first opening end and the end face s2 of the second opening end can be configured nonparallel to two or more surfaces of the plurality of surfaces of the power receiving device 9.

The material of the power receiving coil L2 is not particularly limited. For example, a material having a high conductivity such as copper can be used. The exterior shape of the power receiving coil L2 is not limited to a rectangle, and can be exemplified as a square, a diamond, a polygon having five or more angles, a circle, an ellipse and the like. The interior shape of the power receiving coil L2 preferably follows the exterior shape thereof.

From the viewpoint of the power transmission efficiency, the opening portion 52 comprised in the power receiving coil L2 can also be provided with a magnet core.

The size of the power receiving coil L2 is not particularly limited as long as an appropriate amount of power can be supplied to the power receiving device 9. From the viewpoint of preventing decrease of the power transmission efficiency in a case where the power feeding coil L1 deviates from the optimum power receiving position, the outer contour of the surface of the power receiving coil L2 opposite to the power feeding coil L1 is more outward than the outer contour of the surface of the power feeding coil L1 opposite to the power receiving coil L2.

The power receiving device 9 and the power receiving device body portion 6 are rectangular parallelepiped, but not limited thereto. The power receiving device 9 and the power receiving device body portion 6 can have a plurality of surfaces. For example, a figure including two or more surfaces that have different normal vectors, or a figure including two or more curved surfaces, or a figure including both curved surfaces and flat surfaces may be exemplified.

The size of the power receiving device 9 is not particularly limited as long as it can be charged by the power feeding device. For example, as illustrated in FIG. 1 and FIG. 2, the power receiving device 9 may be a movable small-sized machine, a movable object such as vehicles, or an object having a surface opposite to the power feeding device, of a scale as the floor.

The Second Embodiment

Figure 4:
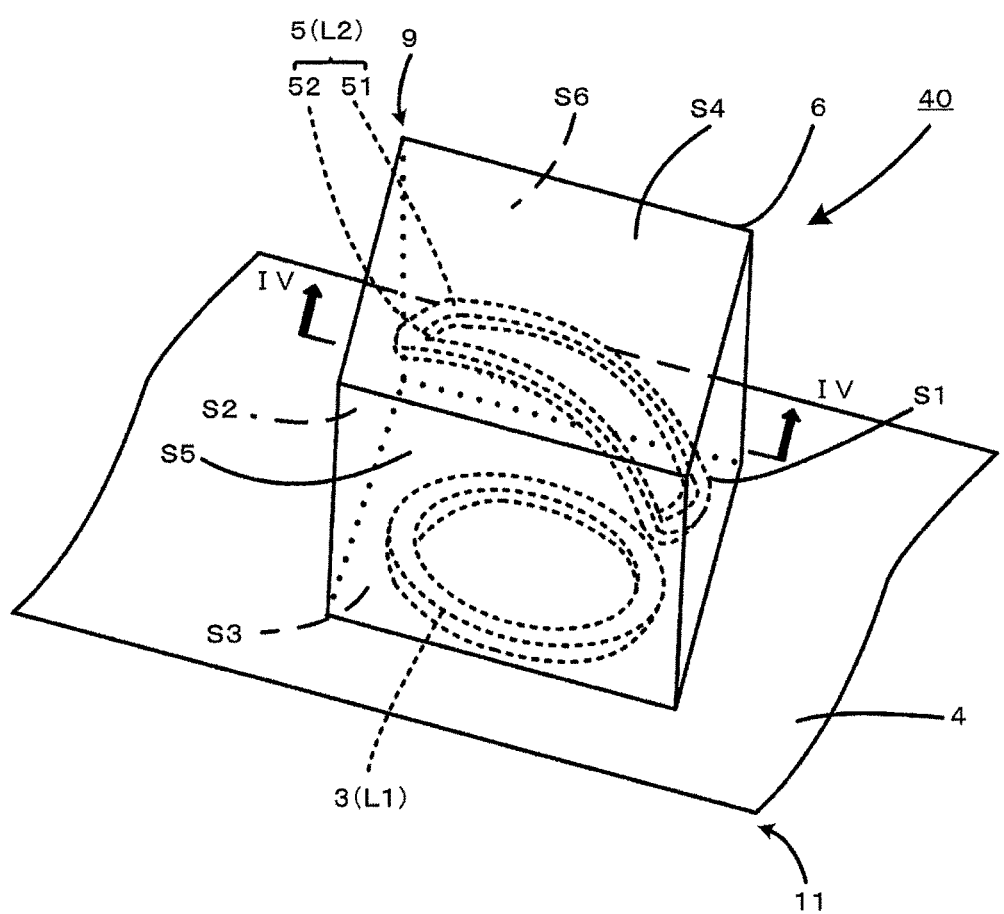
FIG. 4 is a perspective view illustrating a wireless power transmission device of the second embodiment comprising the power receiving device of the present invention.
Figure 5:
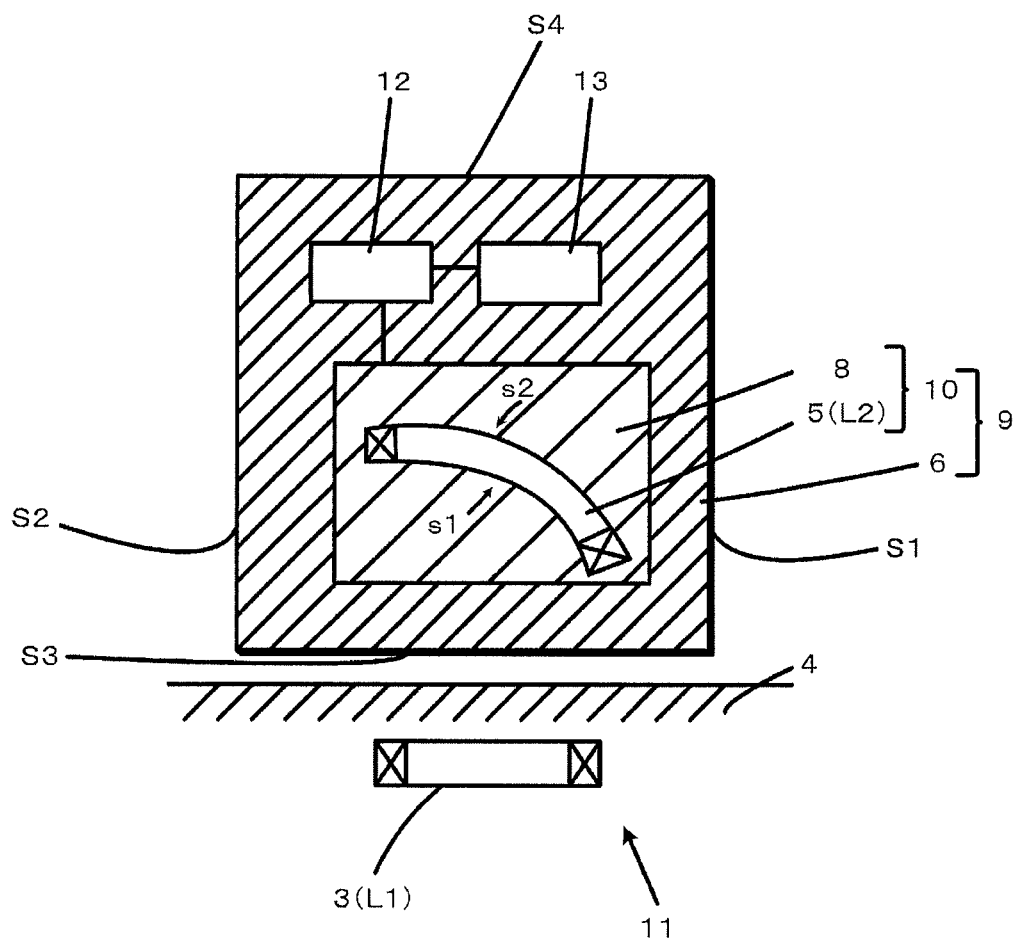
FIG. 5 is a cross-sectional view along the cutting line of IV-IV of the wireless power transmission device of the second embodiment.

FIG. 4 is a perspective view illustrating a wireless power transmission device of the second embodiment comprising the power receiving device of the present invention, and FIG. 5 is a cross-sectional view along the cutting line of IV-IV of the wireless power transmission device of the second embodiment. The wireless power transmission device of the second embodiment is constructed by replacing the planar shape of the power receiving coil L2 of the power receiving device 9 of the first embodiment with a curved shape. That is, the curved power receiving coil L2 of the present embodiment is formed by curving the planar power receiving coil L2 into an arc shape, and is composed of at least one curved protruding portion and two planar portions clamping the protruding portion. Therefore, in the present embodiment, the parts that are different from the first embodiment are described, and repeated description is omitted. Moreover, in the present invention, "curved" means that the slope of the tangent line of the power receiving face changes continuously from positive to negative or changes continuously from negative to positive.

The power receiving coil L2 has a curved opening portion 52, and at least one of the end face s1 of the first opening end and the end face s2 of the second opening end is configured nonparallel to two or more surfaces (six surfaces, S1, S2, S3, S4, S5 and S6 in the present embodiment) of a plurality of surfaces of the power receiving device 9, but is configured perpendicular to two surfaces, S5 and S6.

In the present embodiment, the power receiving coil L2 is curved, and has a protruding portion projecting toward the opposite side of one surface (S3), on which the power feeding device 11 is to be configured, of the plurality of surfaces (S1, S2, S3, S4, S5 and S6) of the power receiving device 9. Herein, regarding the surface (S3) on which the power feeding device 11 is to be configured as illustrated in FIG. 5, in addition to the power receiving portion package 10, the power receiving device 9 carries inside a rectifier 12, a load device 13, the constituents (not illustrated) that operate a power receiving device 9 body (corresponding to an electronic device and the like) and the like, so not all of the surfaces of the power feeding device 11 can supply power. That is, "the surface on which the power feeding device 11 is to be configured" means that "the surface that the power receiving portion package 10 directly oppose without interposing other constituents". In the present embodiment, "the surface on which the power feeding device 11 is to be configured" corresponds to the surfaces S1, S2 and S3 if only considering the positions of the rectifier 12 and the load device 13, and on these surfaces a power receiving area capable of receiving power from the power feeding device 11 is formed.

In FIG. 5, the magnetic flux generated by the power feeding coil L1 is directed at the power receiving coil L2. With the power receiving face being curved, the relative positional relation between two or more surfaces of the power receiving device 9 on which the power receiving area is formed and the power receiving coil L2 varies according to the surface of the power receiving device 9. In such a power receiving device 9, the magnetic flux interlinked with the power receiving coil L2 is changed depending on the difference among the surfaces S1, S2 and S3 of the power receiving device, and by changing the surface of the power receiving device 9 opposite to the power feeding device 11, the electric energy received from the power feeding device 11 can be changed.

Further, the magnetic flux generated by the power feeding coil L1 comprised in the power feeding device 11 tends to be dense from the central portion toward the winding portion at the opening portion of the power feeding coil. Moreover, among the magnetic flux from the power feeding coil L1 toward the power receiving coil L2, the magnetic flux generated at the winding portion side of the power feeding coil L1 has a vector in a direction extending toward the outside of the power receiving coil L2. As such, in a case where the power receiving device 9 and the power feeding device 11 are configured in such a manner that the power receiving coil L2 including a protruding portion projecting toward the direction of the magnetic field and the power feeding coil L1 comprised in the power feeding device 11 are opposite to each other, the magnetic flux generated by the power feeding coil L1 easily interlinks with the power receiving coil L2. As such, the power receiving device 9 includes a surface which can receive the magnetic flux generated by the power feeding coil L1 efficiently, and further, a power receiving device 9 having high power transmission efficiency can be obtained.

Specifically, as illustrated in FIG. 4 and FIG. 5, in a case of charging the power receiving device 9 through the surface S3, since the power receiving coil L2 has a protruding portion projecting toward the opposite side of one surface S3, on which the power feeding device 11 is to be configured, of a plurality of surfaces of the power receiving device 9, with the same size and winding number of the power receiving coil L2 and same condition on the power feeding device side, the power receiving device 9 can have a surface that receives the largest electric energy from the power feeding device 11. In the present embodiment, one power receiving coil L2 has one protruding portion, but not limited thereto, and may have a plurality of protruding portions.

In the power receiving coil L2, the angle formed by the above two planar portions is not particularly limited, preferably larger than 90° but smaller than 180°, further preferably larger than 135° but smaller than 180°.

Moreover, the power receiving device 9 according to the present embodiment can receive power from a plurality of surfaces S1, S2 and S3 of the power receiving device 9 through the power receiving coil L2. As such, even the power receiving device 9 is rotated and the power receiving device is positioned on the power feeding device 11 via the surface S1 or S2, power can also be supplied by inductive coupling of the power feeding coil L1 and the power receiving coil L2. That is, there is no need to use a plurality of coils to provide power to the power receiving device 9 via a plurality of surfaces, and it is allowed that the power receiving device 9 have freedom for configuration to supply power.

Moreover, since the number of the power receiving coil L2 is one, the number of the wirings leaded out from the coils, the number of the control devices connecting to the wirings, etc. can be reduced and the size of the power receiving device 9 is non-limited as compared with a case of using a plurality of coils in order to supply power from a plurality of surfaces. However, the number of the coils is not limited to one, and a plurality of coils can further allow the power receiving device 9 to have freedom for configuration to supply power.

Moreover, in the present embodiment, the power receiving coil L2 is curved, and has a protruding portion projecting to the opposite side of one surface (S3), on which the power feeding device 11 is to be configured, of the plurality of surfaces (S1, S2, S3, S4, S5 and S6) of the power receiving device 9. From the viewpoint of efficiently generating electricity from the magnetic flux generated by the power feeding coil L1, the power receiving coil L2 can also have a protruding portion projecting toward the one surface (S3), on which the power feeding device 11 is to be configured.

With the power receiving coil L2 including a protruding portion projecting toward the opposite side of or projecting toward one surface (S3) on which the power feeding device 11 is to be configured, the magnetic flux generated by the power feeding coil L1 interlinks in a manner of passing through in the same direction with respect to one power receiving face of the power receiving coil L2. For example, if the power receiving coil L2 is configured that one planar portion face one surface, on which the power feeding device 11 is to be configured, via the other planar portion (e.g., the case where the power feeding device 11 is to be configured via the surface S1 or S2), based on the one power receiving face of the power receiving coil L2, magnetic flux generated by the power feeding coil L1 interlinks in the one planar portion and the other planar portion in a manner of passing through in different directions. In that case, current with different directions is generated in the one planar portion and the other planar portion of the power receiving coil L2. As compared with this, in the present embodiment, electricity generated in the power receiving coil L2 with the power feeding device 11 disposed through the surface S3 flows in only one direction, and thus the power receiving device 9 includes a surface which efficiently obtains electricity by magnetic flux generated by the power feeding coil L1. Therefore, a power receiving device 9 having high power transmission efficiency can be obtained.

Moreover, configuration of the power receiving coil L2 is not limited to a configuration in which the power receiving coil L2 has a protruding portion projecting toward the opposite side of or projecting toward one surface (S3) on which the power feeding device 11 is to be configured, and includes, for example, a configuration which protrudes toward the opposite side of or protrude toward the boundary portion between one surface (S3) on which the power feeding device 11 is to be configured and a surface which the power feeding device 11 is not to be configured on and which is adjacent to the one surface (S3).

Further, the power receiving device 9 contacts with the power feeding device 11 via one surface S3, but not limited to only one surface, and can contact with the power feeding device 11 via a plurality of surfaces.

The Third Embodiment

Figure 6:
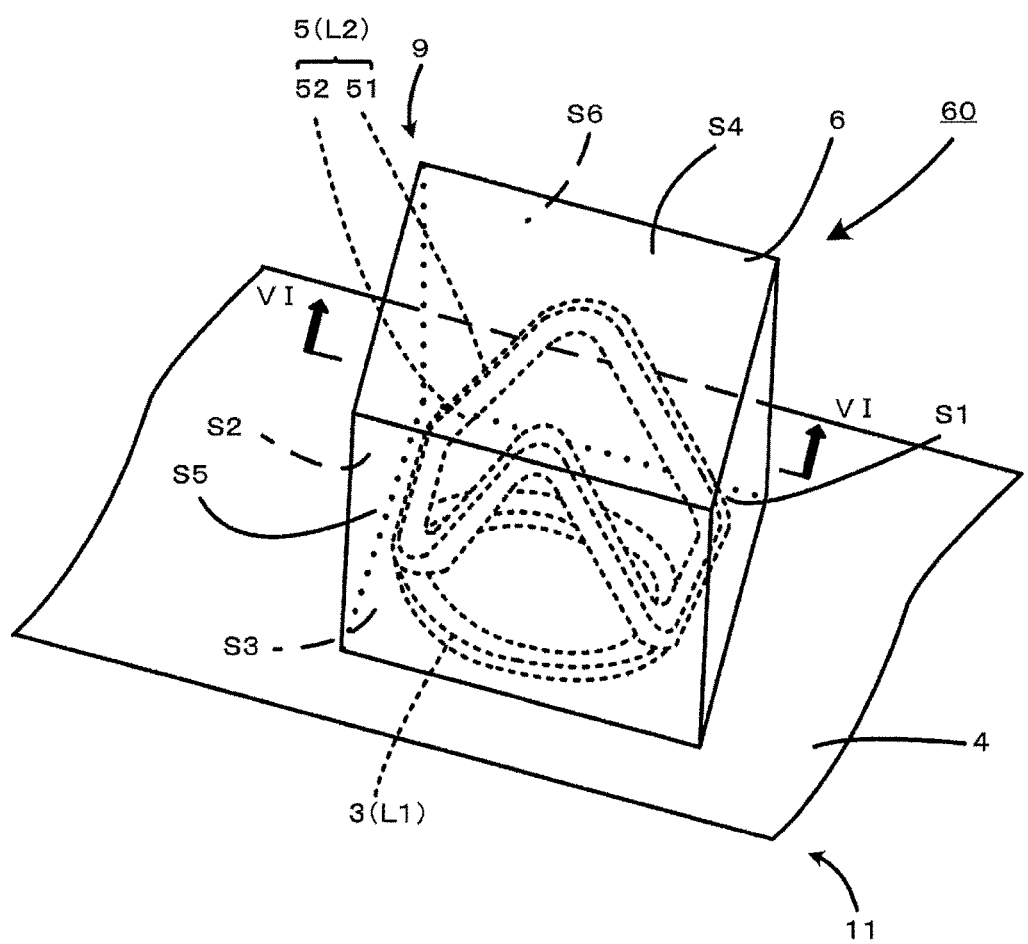
FIG. 6 is a perspective view illustrating a wireless power transmission device of the third embodiment comprising the power receiving device of the present invention.
Figure 7:
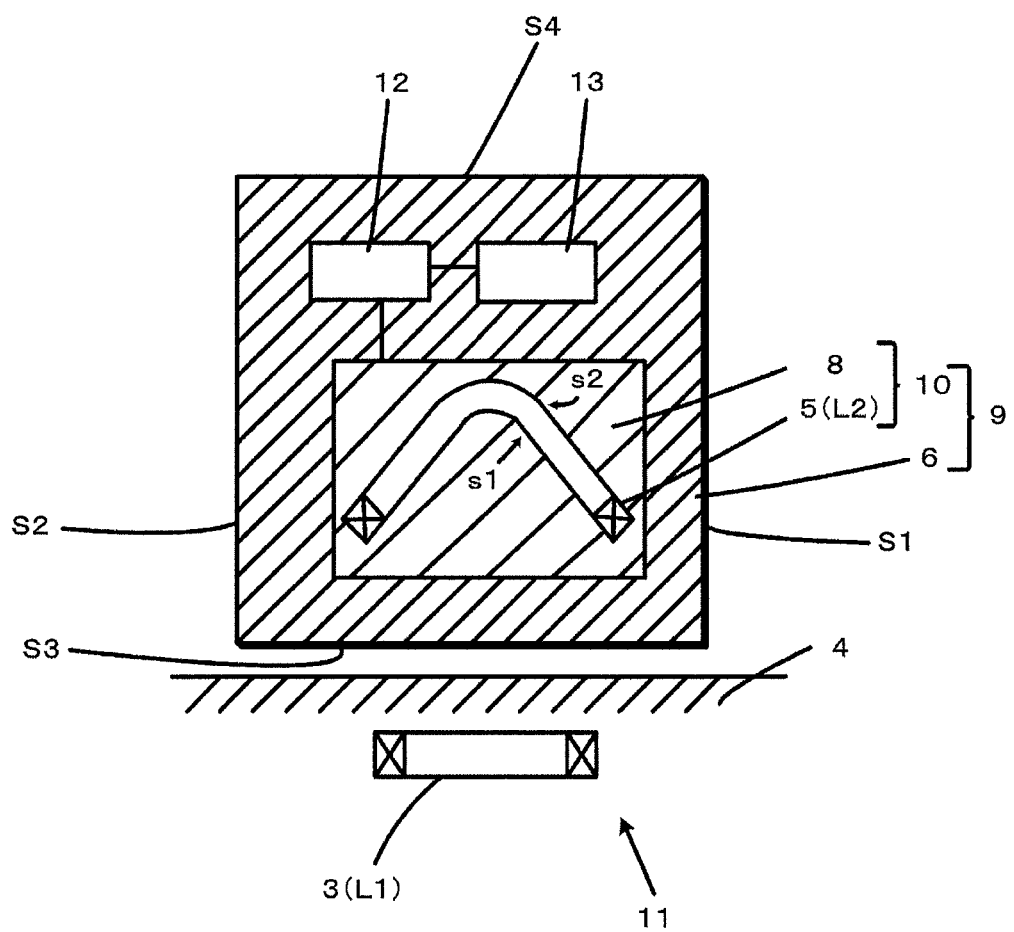
FIG. 7 is a cross-sectional view along the cutting line of VI-VI of the wireless power transmission device of the third embodiment.

FIG. 6 is a perspective view illustrating a wireless power transmission device of the third embodiment comprising the power receiving device of the present invention, and FIG. 7 is a cross-sectional view along the cutting line of VI-VI of the wireless power transmission device of the third embodiment. The wireless power transmission device 60 of the third embodiment is constructed by replacing the planar shape of the power receiving coil L2 of the power receiving device 9 of the first embodiment with a bent shape. That is, the bent power receiving coil L2 of the present embodiment is formed by bending the planar power receiving coil L2, and is consisted of at least one bent protruding portion and two planar portions clamping the protruding portion. Therefore, in the present embodiment, the parts that are different from the first embodiment are described, and repeated description is omitted.

The power receiving coil L2 has a bent opening portion 52, and at least one of the end face s1 of the first opening end and the end face s2 of the second opening end is configured nonparallel to two or more surfaces (six surfaces, S1, S2, S3, S4, S5 and S6 in the present embodiment) of a plurality of surfaces of the power receiving device 9, and is configured perpendicular to two surfaces, S5 and S6.

The method of bending the power receiving coil L2 is not particularly limited. For example, as illustrated in FIG. 6 and FIG. 7, the cross-sectional surface may have a shape of round convex or a shape of angular convex. The number of convex in one power receiving coil L2 is not limited to one, and may be more than one.

In the present embodiment, the power receiving coil L2 is bent, and has a protruding portion projecting toward the opposite side of one surface (S3), on which the power feeding device is to be disposed, of the plurality of surfaces (S1, S2, S3, S4, S5 and S6) of the power receiving device 9. Herein, regarding the surface on which the power feeding device 11 is to be configured as illustrated in FIG. 7, in addition to the power receiving portion package 10, the power receiving device 9 carries inside a rectifier 12, a load device 13, the constituents (not illustrated) that operate a power receiving device 9 body (corresponding to an electronic device and the like) and the like function, so the power feeding device 11 cannot supply power to all the surfaces of the power feeding device 9. That is, "the surface on which the power feeding device 11 is to be configured" means that "the surface that the power receiving portion package 10 directly oppose without interposing other constituents". In the present embodiment, "the surface on which the power feeding device 11 is to be configured" corresponds to the surfaces S1, S2 and S3 if only considering the positions of the rectifier 12 and the load device 13, and on these surfaces a power receiving area capable of receiving power from the power feeding device 11 is formed.

In FIG. 7, the magnetic flux generated by the power feeding coil L1 is directed at the power receiving coil L2. With the power receiving face being bent, the relative positional relation between two or more surfaces of the power receiving device 9 on which the power receiving area is formed and the power receiving coil L2 varies according to the surface of the power receiving device 9. In such a power receiving device 9, the magnetic flux interlinked with the power receiving coil L2 is changed depending on the difference among the surfaces S1, S2 and S3 of the power receiving device, and by changing the surface of the power receiving device 9 opposite to the power feeding device 11, the electric energy received from the power feeding device 11 can be changed.

Further, the magnetic flux generated by the power feeding coil L1 comprised in the power feeding device 11 tends to be dense from the central portion toward the winding portion at the opening portion of the power feeding coil. Moreover, among the magnetic flux from the power feeding coil L1 toward the power receiving coil L2, the magnetic flux generated at the winding portion side of the power feeding coil L1 has a vector in a direction extending toward the outside of the power receiving coil L2. As such, in a case where the power receiving device 9 and the power feeding device 11 are configured in such a manner that the power receiving coil L2 including a protruding portion projecting toward the direction of the magnetic field and the power feeding coil L1 comprised in the power feeding device 11 are opposite to each other, the magnetic flux generated by the power feeding coil L1 easily interlinks with the power receiving coil L2. As such, the power receiving device 9 has a surface which can receive the magnetic flux generated by the power feeding coil L1 efficiently, and further, a power receiving device 9 having high power transmission efficiency can be obtained.

Specifically, as illustrated in FIG. 6 and FIG. 7, in a case of charging the power receiving device through the surface S3, since the power receiving coil L2 has a protruding portion projecting toward the opposite side of one surface S3, on which the power feeding device 11 is to be configured, of a plurality of surfaces of the power receiving device 9, with the same size and winding number of the power receiving coil L2 and same condition on the power feeding device side, the power receiving device 9 can receive the largest electric energy from the power feeding device 11. In the present embodiment, one power receiving coil L2 has one protruding portion, but not limited thereto, and may have a plurality of protruding portions.

In the power receiving coil L2, the angle formed by the above two planar portions is not particularly limited, preferably larger than 90° but smaller than 180°, further preferably larger than 135° but smaller than 180°.

Moreover, the power receiving device 9 according to the present embodiment can receive power from a plurality of surfaces S1, S2 and S3 of the power receiving device 9 through the power receiving coil L2. As such, even the power receiving device 9 is rotated and the power receiving device is positioned on the power feeding device 11 through the surface S1 or S2, power can also be supplied by inductive coupling of the power feeding coil L1 and the power receiving coil L2. That is, there is no need to use a plurality of coils to provide power to the power receiving device 9 via a plurality of surfaces, and it is allowed that the power receiving device 9 have freedom for configuration to supply power.

Moreover, since the number of the power receiving coil L2 is one, the number of the wirings leaded out from the coils, the number of the control devices connecting to the wirings, etc. can be reduced and the size of the power receiving device 9 is non-limited as compared with a case of using a plurality of coils in order to supply power from a plurality of surfaces. However, the number of the coils is not limited to one, and a plurality of coils can further allow the power receiving device 9 to have freedom for configuration to supply power.

Moreover, in the present embodiment, the power receiving coil L2 is bent, and has a protruding portion projecting toward the opposite side of one surface (S3), on which the power feeding device 11 is to be configured, of the plurality of surfaces (S1, S2, S3, S4, S5 and S6) of the power receiving device 9. From the viewpoint of efficiently generating electricity from the magnetic flux generated by the power feeding coil L1, the power receiving coil L2 can also have a protruding portion projecting toward the one surface (S3), on which the power feeding device 11 is to be configured.

With the power receiving coil L2 including a protruding portion projecting toward the opposite side of or projecting toward one surface (S3) on which the power feeding device 11 is to be configured, the magnetic flux generated by the power feeding coil L1 interlinks in a manner of passing through in the same direction with respect to one power receiving face of the power receiving coil L2. For example, if the power receiving coil L2 is configured that one planar portion face one surface, on which the power feeding device 11 is to be configured, via the other planar portion (e.g., the case where the power feeding device 11 is to be configured via the surface S1 or S2), based on the one power receiving face of the power receiving coil L2, magnetic flux generated by the power feeding coil L1 interlinks in the one planar portion and the other planar portion in a manner of passing through in different directions. In that case, current with different directions is generated in the one planar portion and the other planar portion of the power receiving coil L2. As compared with this, in the present embodiment, electricity generated in the power receiving coil L2 with the power feeding device 11 disposed through the surface S3 flows in only one direction, and thus the power receiving device 9 includes a surface which efficiently obtains electricity by magnetic flux generated by the power feeding coil L1. Therefore, a power receiving device 9 having high power transmission efficiency can be obtained.

Moreover, configuration of the power receiving coil L2 is not limited to a configuration in which the power receiving coil L2 has a protruding portion projecting toward the opposite side of or projecting toward one surface (S3) on which the power feeding device 11 is to be configured, and includes, for example, a configuration which protrudes toward the opposite side of or protrudes toward the boundary portion between one surface (S3) on which the power feeding device 11 is to be configured and a surface which the power feeding device 11 is not to be configured on and which is adjacent to the one surface (S3).

Further, the power receiving device 9 contacts with the power feeding device 11 via one surface S3, but not limited to only one surface, and can contact with the power feeding device 11 via a plurality of surfaces.

Power Feeding Device

The Fourth Embodiment

Figure 8:
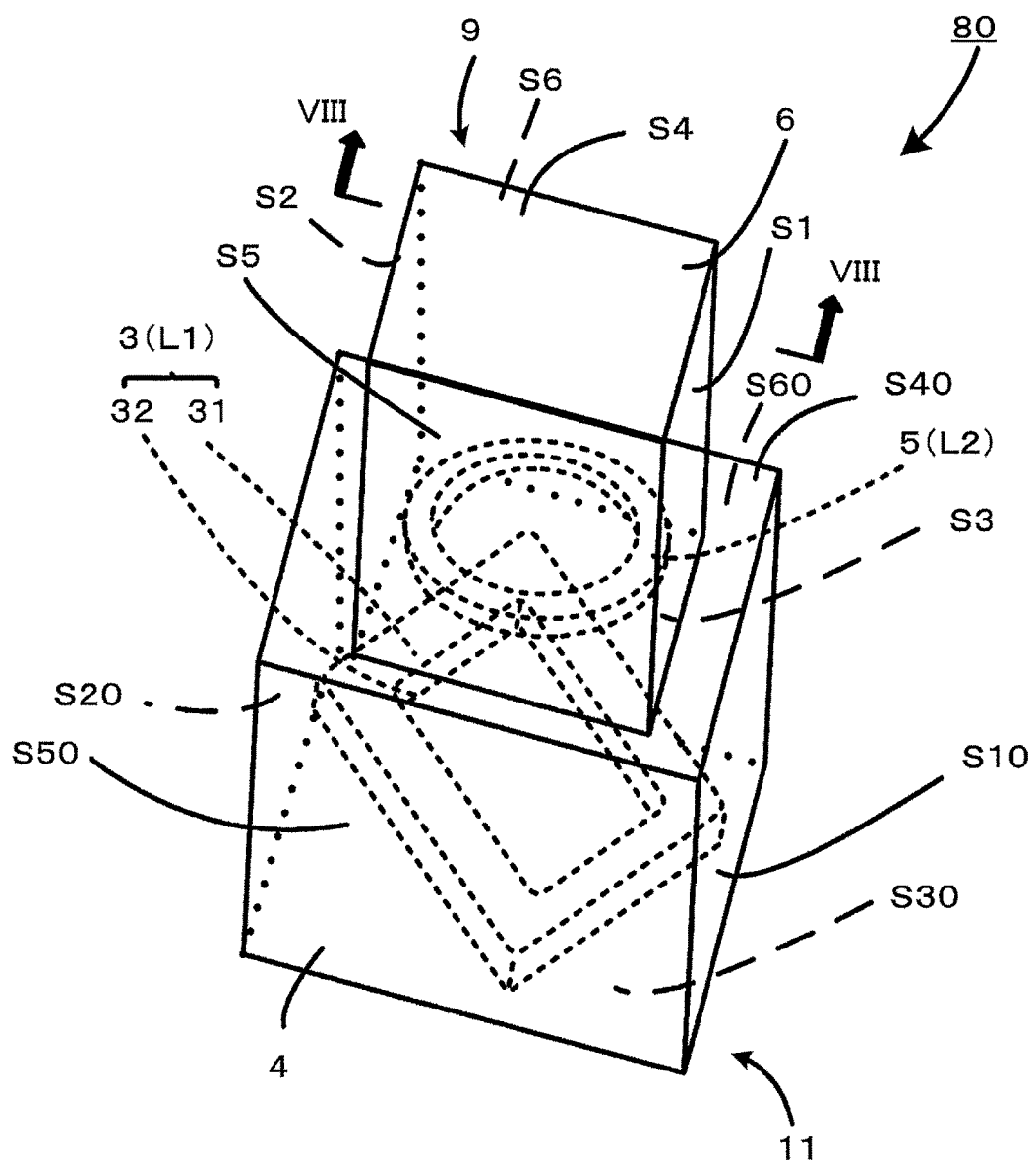
FIG. 8 is a perspective view illustrating a wireless power transmission device of the fourth embodiment comprising the power feeding device of the present invention.
Figure 9:
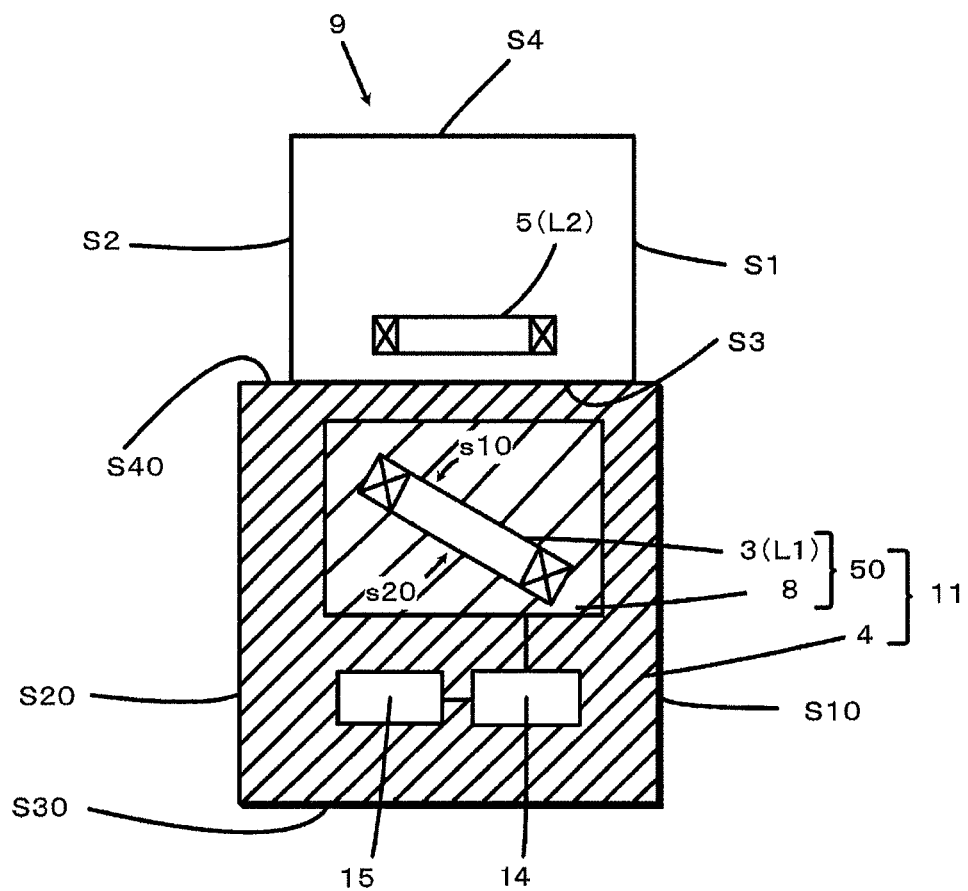
FIG. 9 is a cross-sectional view along the cutting line of VIII-VIII of the wireless power transmission device of the fourth embodiment.

FIG. 8 is a perspective view illustrating a wireless power transmission device of the fourth embodiment comprising the power feeding device of the present invention, and FIG. 9 is a cross-sectional view along the cutting line of VIII-VIII of the wireless power transmission device of the fourth embodiment. The wireless power transmission device 80 of the fourth embodiment illustrated in FIG. 8 and FIG. 9 includes a power receiving device 9 and a power feeding device 11 of the present invention. The power receiving device 9 includes: a power receiving device body portion 6; a power receiving portion 5 provided inside the power receiving device body portion 6 and receiving the magnetic field to generate electricity; a rectifier (not illustrated) that converts alternating current generated in the power receiving portion 5 into direct current; and a load device (not illustrated) such as a battery or LED that stores or consumes the direct current converted by the rectifier 12. The power feeding device 11 includes: a power feeding device body portion 4; a battery 15 that is provided inside the power feeding device body portion 4 and stores direct current; a drive circuit 14 that converts the direct current received from the battery into alternating current; and a power feeding portion 3 that generates magnetic field by using the alternating current converted by the drive circuit 14. The power receiving portion 5 is composed of a power receiving coil L2, and the power feeding portion 3 is composed of a power feeding coil L1. By electromagnetically coupling the power receiving coil L2 and the power feeding coil L1, electricity from the power feeding device 11 is wirelessly transmitted to the power receiving device 9.

As illustrated in FIG. 8 and FIG. 9, the power feeding device 11 is a rectangular parallelepiped having six surfaces, S10, S20, S30, S40, S50 and S60. The power feeding device 11 includes a power feeding device body portion 4 and a power feeding portion package 50 that packages the power feeding coil L1 via resin or the like. The power feeding portion package 50 has an outer shape of rectangular parallelepiped, and is positioned inside the power feeding device body portion 4. The power feeding device body portion 4 has an outer shape corresponding to that of the power feeding device 11.

In the present embodiment, the power feeding coil L1 is a planar coil. The power feeding coil L1 comprises: a winding portion 31 with wires wound; an opening portion 32 surrounded by the winding portion 31 and having two opposite opening ends. Specifically, the power feeding coil L1 is constructed by taking two opposite power feeding faces formed from the opening end of the opening portion 32 and surfaces of the winding portion 31 surrounding the opening end as the main surfaces. If the alternating current flows into the winding portion 31, magnetic flux interlinking with the power feeding coil L1 is generated. More specifically, the opening portion 32 is provided in e.g., central portion of the power feeding coil L1 and magnetic flux with a high density is generated in the opening portion 32. In the opening portion 32, the magnetic flux tends to be dense from the central portion toward the winding portion 31. Since electricity flows into the winding portion 31 and generates magnetic flux with a high density at the opening portion 32, with an end face of at least one opening end of the two opening ends of the opening portion 32 being configured nonparallel (but not including perpendicular) to two or more surfaces of the power feeding device 11 as described hereafter in detail, a power feeding area capable of transmitting power to the power receiving device 9 is formed on the two or more surfaces of the power feeding device 11.

The power feeding coil L1 can particularly preferably use a planar coil in which length from an end face of one opening end (an end face s10 of the first opening end) to an end face of the other opening end (an end face s20 of the second opening end) is shorter than the sides that foal' the power receiving face. The power feeding coil L1 is for example, a planar coil formed from a single layer of winding wires, a planar coil formed from winding wires laminated in a vertical direction, or a planar coil combining these shapes.

In FIG. 9, the magnetic flux generated in the power feeding coil L1 is directed at the power receiving coil L2. With the power feeding coil L1 being a planar coil, the magnetic flux generated is not counteracted. As such, electricity can be transmitted into the power receiving device 9 in a state where the magnitude of the magnetic flux is not reduced in the power feeding coil L1.

In the power feeding coil L1, at least one of the end face s10 of the first opening end and the end face s20 of the second opening end is configured nonparallel (but not including perpendicular) to two or more surfaces (six surfaces, S10, S20, S30, S40, S50 and S60 in the present embodiment) of the plurality of surfaces of the power feeding device 11. As such, the two or more surfaces (five surfaces S10, S20, S40, S50 and S60 if only considering the positions of the drive circuit 14 and the battery 15 in the present embodiment) of the power feeding device 11 are formed with a power receiving area capable of transmitting power to the power receiving device 9. Herein, the "power feeding area" formed on the two or more surfaces of the power feeding device 11 is "an area in which magnetic flux generated by the power feeding coil L1 interlinks" If the power receiving device 9 and the power feeding device 11 is to be configured in such a manner that the power feeding coil L1 and the power receiving coil L2 are opposite to each other, electromagnetic induction occurs between the power feeding coil L1 and the power receiving coil L2, and the electricity transmits from the power feeding device 11 to the power receiving device 9 via the power feeding area. In such a power feeding device 11, since the surfaces S10, S20, S50 and S60 are also formed with a power feeding area, the electricity can be supplied to the power receiving device 9 via the surfaces S10, S20, S50 and S60, in addition to S40.

From the viewpoint of the efficiency of transmitting power from the power feeding device 11 to the power receiving device 9, the end face s10 of the first opening end and the end face s20 of the second opening end may have an angle titling to be larger than 0° but smaller than 90° with respect to the surface most suitable for the power receiving device 9 to receive power (the surface that has the largest power receiving area, the surface that can be contacted in the most stable state with respect to the surface of the power feeding device, and the like), preferably an angle tilting to be larger than 0° but smaller than 45°. From the viewpoint of reducing fluctuation of power transmission efficiencies on various surfaces, the angle formed is preferably 30° or larger but 60° or smaller, further preferably 35° or larger but 55° or smaller, more preferably 40° or larger but 50° or smaller.

According to the power feeding device 11 of the present embodiment, a plurality of surfaces can be used to supply power without using a plurality of coils, thereby allowing the power receiving device 9 to have freedom for configuration to supply power. When using one power feeding coil L1 and forming a power feeding area on two or more surfaces of the power feeding device 11, in order to increase the coupling coefficient of the power feeding coil L1 and the power receiving coil L2 and reduce unwanted radiation to the outside, the average distance from the surface of the power feeding device 11 on which a power feeding area is formed to the end face s10 of the first opening end is preferably short.

In the present embodiment, since the number of the power feeding coil L1 is one, the number of the wirings leaded out from the coils, the number of the control devices connecting to the wirings, etc. can be reduced and the size of the power feeding device 11 is non-limited as compared with a case of using a plurality of coils in order to supply power from a plurality of surfaces. The coils are not limited to one in number, and a plurality of coils can further allow the power receiving device 9 to have freedom for configuration to supply power.

In the present embodiment, although the power feeding coil L1 is a planar coil, a part of the winding portion 31 can also comprises a curved portion or a tilt portion as long as at least one of the end face s10 of the first opening end and the end face s20 of the second opening end can be configured nonparallel to two or more surfaces of the plurality of surfaces of the power feeding device 11.

The material of the power feeding coil L1 is not particularly limited. For example, a material having a high conductivity such as copper can be used. The exterior shape of the power feeding coil L1 is not limited to a rectangle, and can be exemplified as a square, a diamond, a polygon having five or more angles, a circle, an ellipse and the like. The interior shape of the power feeding coil L1 preferably follows the exterior shape thereof.

From the viewpoint of the power transmission efficiency, the opening portion 32 comprised in the power feeding coil L1 can also be provided with a magnet core.

The size of the power feeding coil L1 is not particularly limited as long as an appropriate amount of power can be supplied to the power receiving device 9. From the viewpoint of preventing decrease of the power transmission efficiency in a case where the power feeding coil L1 deviates from the optimum power receiving position, the outer contour of the surface of the power feeding coil L1 opposite to the power receiving coil L2 is more inward than the outer contour of the surface of the power receiving coil L2 opposite to the power feeding coil L1.

The power feeding device 11 and the power feeding device body portion 4 are rectangular parallelepiped, but not limited thereto. The power feeding device 11 and the power feeding device body portion 4 can have a plurality of surfaces. For example, a figure including two or more surfaces that have different normal vectors, or a figure including two or more curved surfaces, or a figure including both curved surfaces and flat surfaces may be exemplified.

The size of the power feeding device 11 is not particularly limited as long as it can charge to the power receiving device. For example, as illustrated in FIG. 8 and FIG. 9, the power feeding device 11 may be an object having a surface opposite to the power receiving device, of a scale as the floor or a movable small-sized machine.

The Fifth Embodiment

Figure 10:
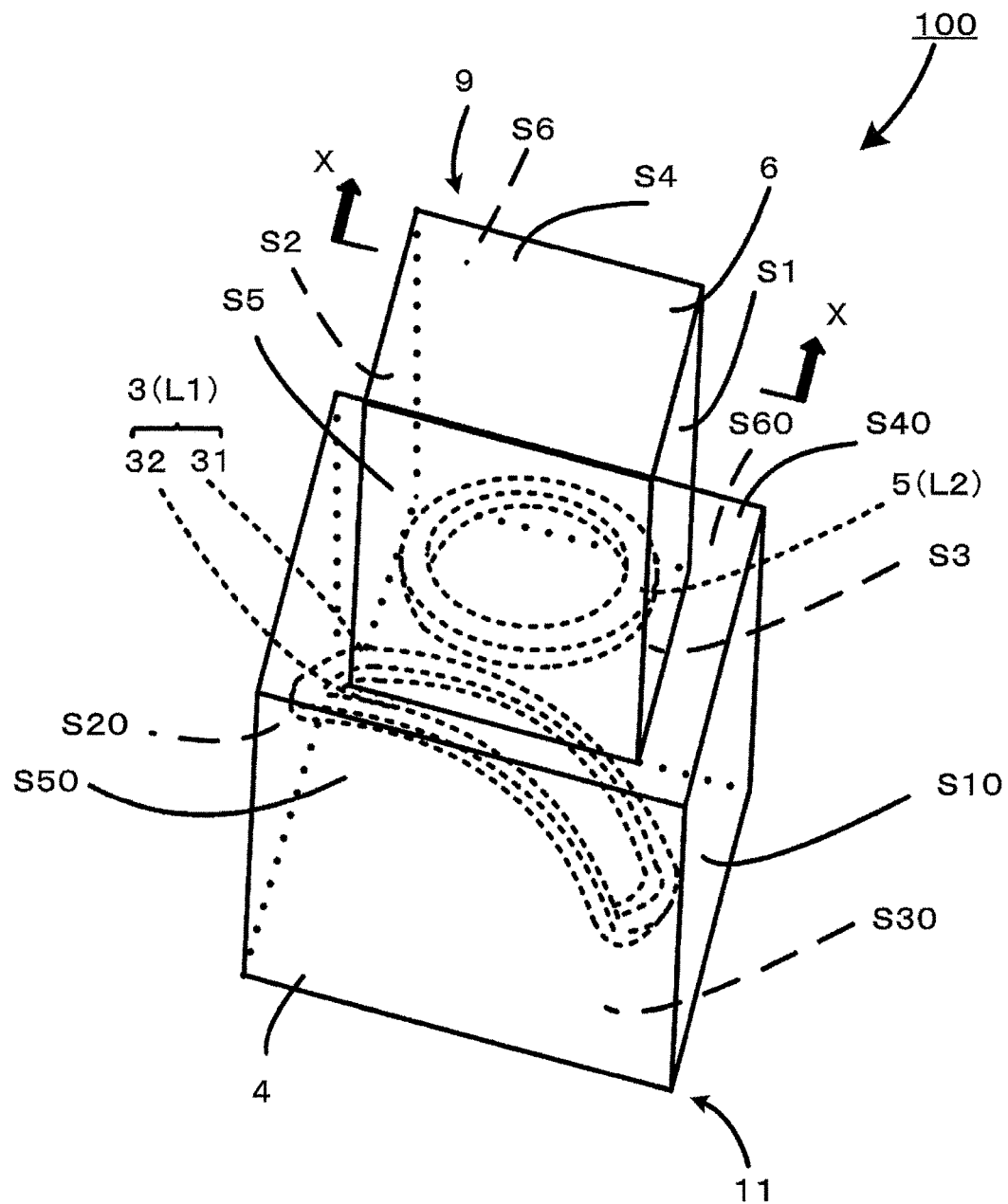
FIG. 10 is a perspective view illustrating a wireless power transmission device of the fifth embodiment comprising the power feeding device of the present invention.
Figure 11:
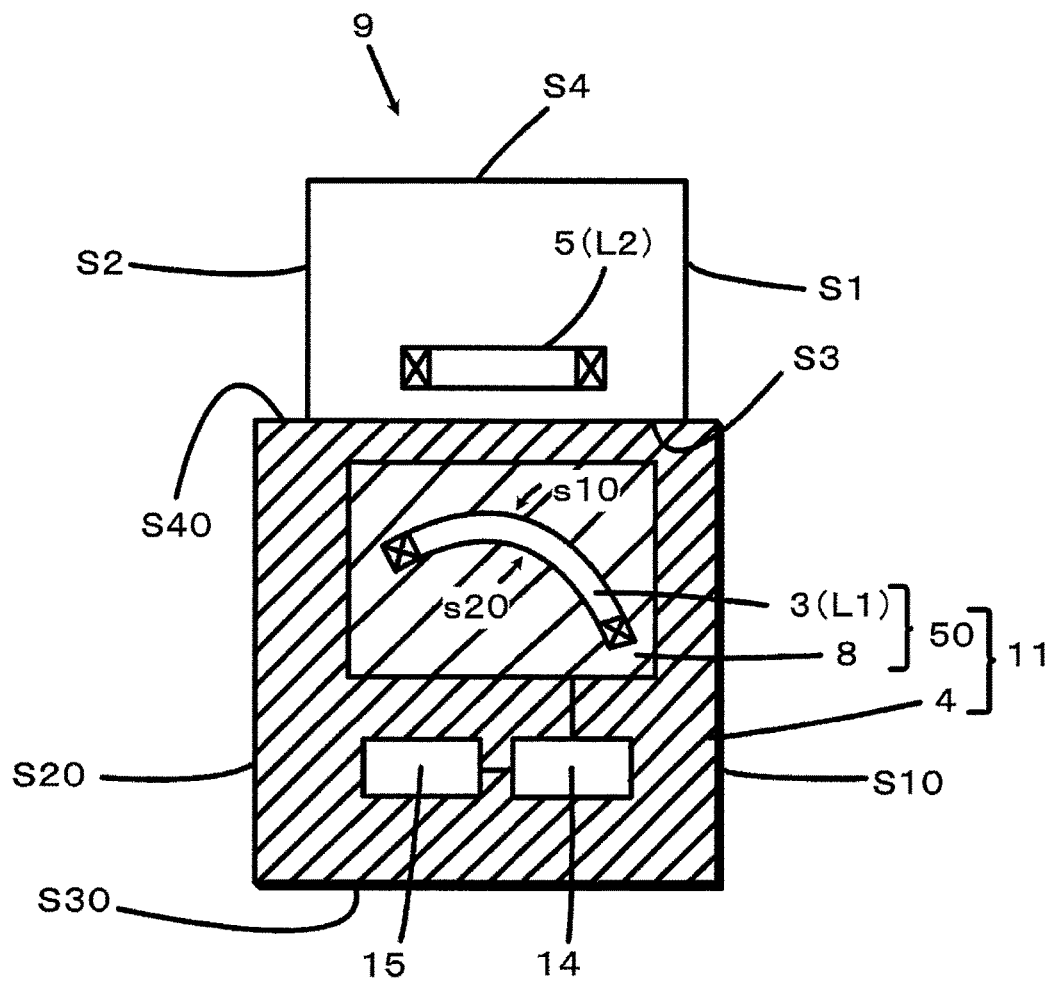
FIG. 11 is a cross-sectional view along the cutting line of X-X of the wireless power transmission device of the fifth embodiment.

FIG. 10 is a perspective view illustrating a wireless power transmission device of the fifth embodiment comprising the power feeding device of the present invention, and FIG. 11 is a cross-sectional view along the cutting line of X-X of the wireless power transmission device of the fifth embodiment. The wireless power transmission device 100 of the fifth embodiment is constructed by replacing the planar shape of the power feeding coil L1 of power feeding device 11 of the fourth embodiment with a curved shape. That is, the curved power feeding coil L1 of the present embodiment is formed by curving the planar power feeding coil L1 into an arc shape, and composed of at least one curved protruding portion and two planar portions clamping the protruding portion. Therefore, in the present embodiment, the parts that are different from the fourth embodiment are described, and repeated description is omitted. Moreover, in the present invention, "curved" means that the slope of the tangent line of the power feeding face changes continuously from positive to negative or changes continuously from negative to positive.

The power feeding coil L1 has a curved opening portion 32, and at least one of the end face s10 of the first opening end and the end face s20 of the second opening end is configured nonparallel to two or more surfaces (six surfaces, S10, S20, S30, S40, S50 and S60 in the present embodiment) of a plurality of surfaces of the power feeding device 11, but is configured perpendicular to two surfaces, S50 and S60.

In the present embodiment, the power feeding coil L1 is curved, and has a protruding portion projecting toward one surface (S40), on which the power receiving device 9 is to be configured, of the plurality of surfaces (S10, S20, S30, S40, S50 and S60) of the power feeding device 11. Herein, regarding the surface on which the power receiving device 9 is to be configured as illustrated in FIG. 11, in addition to the power feeding portion package 50, the power feeding device 11 carries inside a drive circuit 14, a battery 15, the constituents (not illustrated) to operate functions that supply power to a power receiving device 9 body (corresponding to an electronic device and the like), and the like, so power cannot be supplied to the power receiving device 9 from all of the surfaces of the power feeding device 11. That is, "the surface on which the power receiving device 9 is to be configured" means that "the surfaced that the power feeding portion package 50 directly oppose without interposing surfaces of other constituents". In the present embodiment, "the surface on which the power receiving device 9 is to be configured" corresponds to the surfaces S10, S20 and S40 if only considering the positions of the drive circuit 14 and the battery 15, and on these surfaces a power feeding area capable of transmitting power to the power receiving device 9 is formed.

In FIG. 11, the magnetic flux generated by the power feeding coil L1 is directed at the power receiving coil L2. With the power feeding face being curved, the relative positional relation between two or more surfaces of the power feeding device 11 on which the power feeding area is formed and the power feeding coil L1 varies according to the surface of the power feeding device 11. In such a power feeding device 11, the magnetic flux in the surface of the power feeding device 11, on which the power feeding area is formed, is changed depending on the difference among the surfaces S10, S20 and S40 of the power feeding device, and by changing the surface of the power feeding device 11 opposite to the power receiving device 9, the electric energy transmitted to the power receiving device 9 can be changed.

Further, since the magnetic flux is generated in a perpendicular direction with respect to the power feeding face of the power feeding coil L1, with the power feeding coil having the above configuration, the magnetic flux generated inside the power feeding coil L1 is not counteracted with each other. As such, the power feeding device 11 has a surface which can particularly efficiently transmits power to the power receiving device 9 without decreasing the magnitude of the magnetic flux in the power feeding coil L1.

Specifically, as illustrated in FIG. 10 and FIG. 11, in a case of charging the power receiving device 9 through the surface S40, since the power feeding coil L1 has a protruding portion projecting toward one surface S40, on which the power receiving device 9 is to be configured, of a plurality of surfaces of the power feeding device 11, with the other conditions such as magnitude of alternating current applied to power feeding coil L1 being the same, the power feeding device 11 can transmits the largest electric energy to the power receiving device 9. In the present embodiment, one power feeding coil L1 has one protruding portion, but not limited thereto, and may have a plurality of protruding portions.

In the power feeding coil L1, the angle formed by the above two planar portions is not particularly limited, preferably larger than 90° but smaller than 180°, further preferably larger than 135° but smaller than 180°.

Moreover, the power feeding device 11 according to the present embodiment forms a power feeding area on a plurality of surfaces S10, S20 and S40 of the power feeding device 11 through the power feeding coil L1, and can transmit power from the area. As such, even the power feeding device 11 is rotated and the power receiving device 9 is positioned on the power feeding device 11 through the surface S10 and S20, power can be supplied by inductive coupling of the power feeding coil L1 and the power receiving coil L2. That is, there is no need to use a plurality of coils to provide power to the power receiving device 9 via a plurality of surfaces, and it is allowed that the power feeding device 11 have freedom for configuration to supply power.

Moreover, since the number of the power feeding coil L1 is one, the number of the wirings leaded out from the coils, the number of the control devices connecting to the wirings, etc. can be reduced and the size of the power feeding device 11 is non-limited as compared with a case of using a plurality of coils in order to supply power from a plurality of surfaces. However, the number of the coils is not limited to one, and a plurality of coils can further allow the power feeding device 11 to have freedom for configuration to supply power.

In the present embodiment, the power feeding coil L1 is curved, and has a protruding portion projecting toward one surface (S40), on which the power receiving device 9 is to be configured, of a plurality of surfaces (S10, S20, S30, S40, S50 and S60) of the power feeding device 11. From the viewpoint that most of the magnetic flux generated by the power feeding face contributes to power supply, the power feeding coil L1 can also have a protruding portion projecting toward the opposite side of the one surface (S40), on which the power receiving device 9 is to be configured.

For example, if the power feeding coil L1 is configured so that one planar portion face one surface, on which the power receiving device 9 is to be configured, via the other planar portion (e.g., the case where the power receiving device 9 is configured via the surface S10 or S20), magnetic flux generated by the planar portion (herein, the other planar portion) opposite to S10 or S20 substantially contributes to transmission of power to the power receiving device 9. As such, electric current generated in the power receiving coil L12 becomes smaller. On the contrary, according to the present embodiment, since magnetic flux generated by two planar portions contributes to transmission of power to the power receiving device 9, a power feeding device 11 having a surface capable of generating a larger current to the power receiving coil L2 can be provided.

Moreover, the configuration of the power feeding coil L1 is not limited to a configuration in which the power feeding coil L1 has a protruding portion projecting toward or projecting toward the opposite side of one surface (S40) on which the power receiving device 9 is to be configured, and includes, for example, a configuration which protrudes toward or protrudes toward the opposite side of the boundary portion between one surface (S40) on which the power receiving device 9 is to be configured and a surface (S10 or S20) which the power receiving device 9 is not to be configured on and is adjacent to the one surface (S40).

Further, the power feeding device 11 contacts with the power receiving device 9 via one surface S40, but not limited to only one surface, and can contact with the power receiving device 9 via a plurality of surfaces.

The Sixth Embodiment

Figure 12:
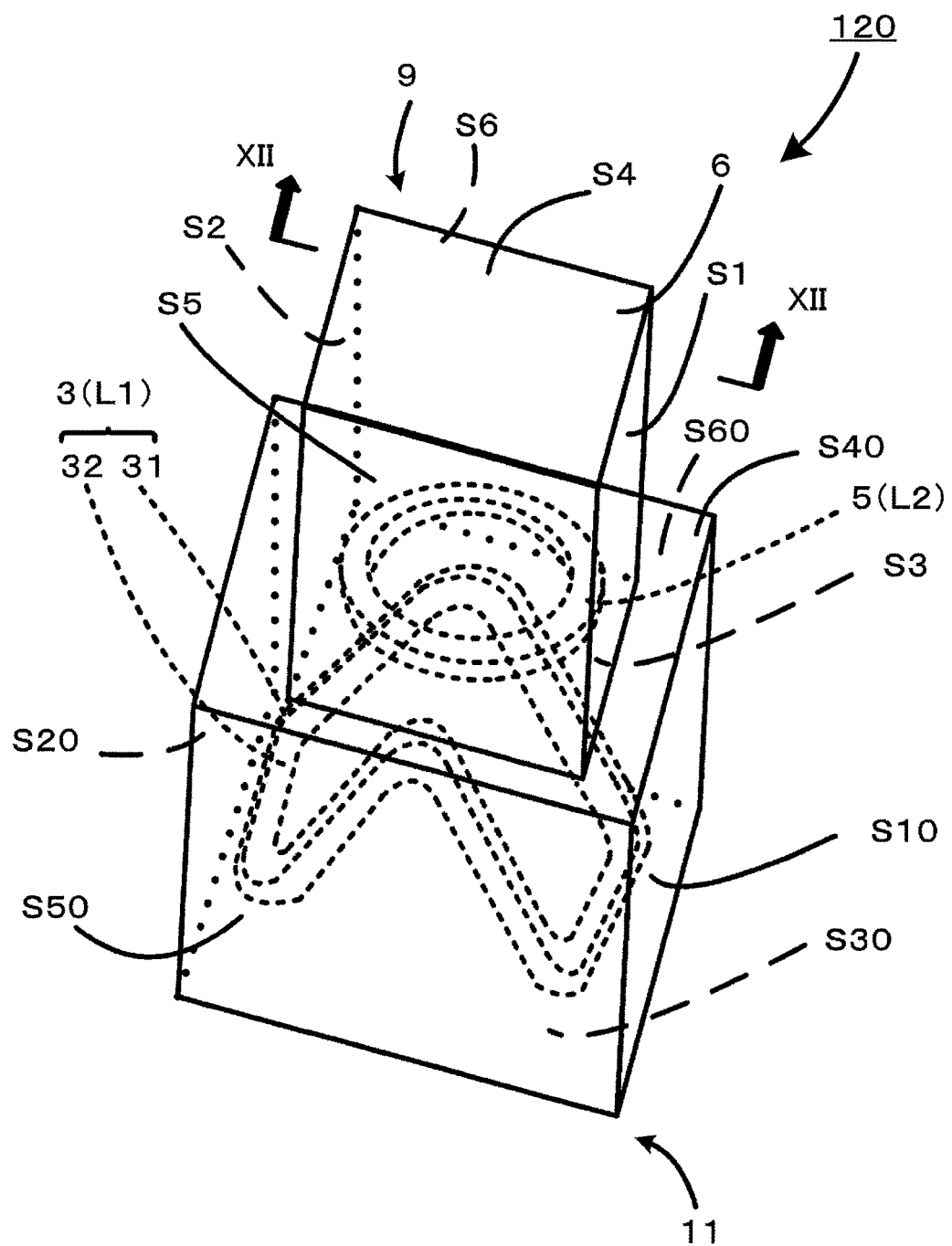
FIG. 12 is a perspective view illustrating a wireless power transmission device of the sixth embodiment comprising the power feeding device of the present invention.
Figure 13:
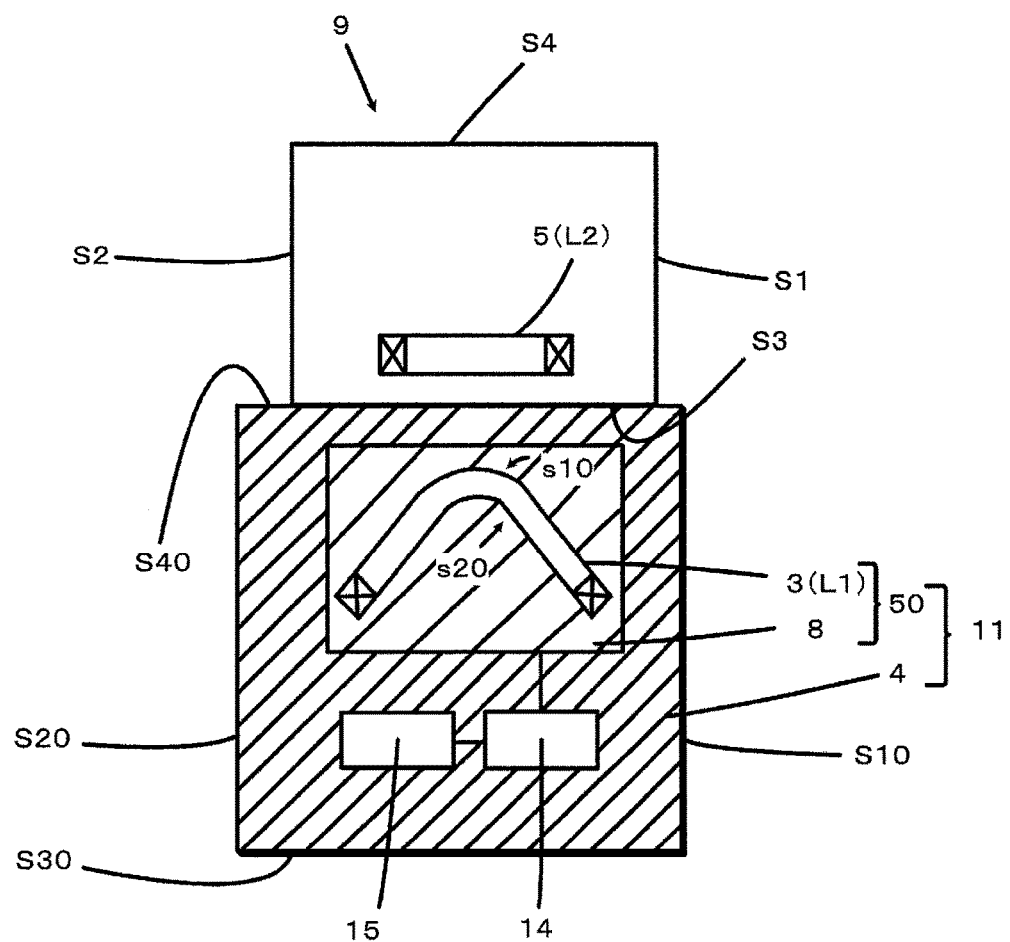
FIG. 13 is a cross-sectional view along the cutting line of XII-XII of the wireless power transmission device of the sixth embodiment.

FIG. 12 is a perspective view illustrating a wireless power transmission device of the sixth embodiment comprising the power feeding device of the present invention, and FIG. 13 is a cross-sectional view along the cutting line of XII-XII of the wireless power transmission device of the sixth embodiment. The wireless power transmission device 120 of the sixth embodiment is constructed by replacing the planar shape of the power feeding coil L1 of the power feeding device 11 of the fourth embodiment with a bent shape. That is, the bent power feeding coil L1 of the present embodiment is formed by bending the planar power feeding coil L1 of the fourth embodiment, and is composed of at least one bent protruding portion and two planar portions clamping the protruding portion. Therefore, in the present embodiment, the parts that are different from the fourth embodiment are described, and repeated description is omitted.

The power feeding coil L1 has a bent opening portion 32, and at least one of the end face s10 of the first opening end and the end face s20 of the second opening end is configured nonparallel to two or more surfaces (six surfaces, S10, S20, S30, S40, S50 and S60 in the present embodiment) of a plurality of surfaces of the power feeding device 11, but is configured perpendicular to two surfaces, S50 and S60.

The method of bending the power feeding coil L1 is not particularly limited. For example, as illustrated in FIG. 12 and FIG. 13, the cross-sectional surface may have a shape of round convex or a shape of angular convex. The number of convex in one power feeding coil L1 is not limited to one, and may be more than one.

In the present embodiment, the power feeding coil L1 is bent, and has a protruding portion projecting toward one surface (S40), on which the power receiving device 9 is to be configured, of the plurality of surfaces (S10, S20, S30, S40, S50 and S60) of the power feeding device 11. Herein, regarding the surface on which the power receiving device 9 is to be configured as illustrated in FIG. 13, in addition to the power receiving portion package 50, the power feeding device 11 carries inside a drive circuit 14, a battery 15, the constituents (not illustrated) to operate functions that supply power to a power feeding device 11 body (corresponding to an electronic device and the like), and the like, so the power receiving device 9 cannot be transmitted power from all the surfaces of the power feeding device 11. That is, "the surface on which the power receiving device 9 is to be configured" means that "the surface that the power feeding portion package 50 directly oppose without interposing other constituents". In the present embodiment, "the surface on which the power receiving device 9 is to be configured" corresponds to the surfaces S10, S20 and S40 if only considering the positions of the drive circuit 14 and the battery 15, and on these surfaces a power feeding area capable of transmitting power to the power receiving device 9 is formed.

In FIG. 13, the magnetic flux generated by the power feeding coil L1 is directed at the power receiving coil L2. With the power feeding face being bent, the relative positional relation between two or more surfaces of the power feeding device 11 on which the power feeding area is formed and the power feeding coil L1 varies according to the surface of the power feeding device 11. In such a power feeding device 11, the magnetic flux in the surface of the power feeding device 11 on which a power feeding area is formed is changed depending on the difference among the surfaces S10, S20 and S40 of the power feeding device, and by changing the surface of the power feeding device 11 opposite to the power receiving device 9, the electric energy transmitted to the power receiving device 9 can be changed.

Further, since the magnetic flux is generated by the power feeding coil L1 in a perpendicular direction with respect to the power feeding face of the power feeding coil L1, with the power feeding coil L1 having the above configuration, the magnetic flux generated inside the power feeding coil L1 is not counteracted with each other. As such, the power feeding device 11 has a surface which can particularly efficiently transmits power to the power receiving device 9 without decreasing the magnitude of the magnetic flux in the power feeding coil L1.

Specifically, as illustrated in FIG. 12 and FIG. 13, in a case of charging the power receiving device 9 through the surface S40, since the power feeding coil L1 has a protruding portion projecting toward one surface S40, on which the power feeding device 11 is to be configured, of the plurality of surfaces of the power feeding device 11, with the other conditions such as magnitude of alternating current applied to power feeding coil L1 being the same, the power feeding device 11 can transmits the largest electric energy to the power receiving device 9. In the present embodiment, one power feeding coil L1 has one protruding portion, but not limited thereto, and may have a plurality of protruding portions.

In the power feeding coil L1, the angle formed by the above two planar portions is not particularly limited, preferably larger than 90° but smaller than 180°, further preferably larger than 135° but smaller than 180°.

Moreover, the power feeding device 11 according to the present embodiment forms a power feeding area on a plurality of surfaces S10, S20 and S40 of the power feeding device 11 through the power feeding coil L1, and can transmit power from the area. As such, even the power feeding device 11 is rotated and the power receiving device 9 is positioned on the power feeding device 11 through the surface S10 and S20, power can be supplied by inductive coupling of the power feeding coil L1 and the power receiving coil L2. That is, there is no need to use a plurality of coils to provide power to the power receiving device 9 via a plurality of surfaces, and it is allowed that the power feeding device 11 have freedom for configuration to supply power.

Moreover, since the number of the power feeding coil L1 is one, the number of the wirings leaded out from the coils, the number of the control devices connecting to the wirings, etc. can be reduced and the size of the power feeding device 11 is non-limited as compared with a case of using a plurality of coils in order to supply power from a plurality of surfaces. However, the number of the coils is not limited to one, and a plurality of coils can further allow the power feeding device 11 to have freedom for configuration to supply power.

In the present embodiment, the power feeding coil L1 is bent, and has a protruding portion projecting toward one surface (S40), on which the power receiving device 9 is to be configured, of the a plurality of surfaces (S10, S20, S30, S40, S50 and S60) of the power feeding device 11. From the viewpoint that most of the magnetic flux generated from the power feeding face contributes to power supply, the power feeding coil L1 can also have a protruding portion projecting toward the opposite side of the one surface (S40), on which the power receiving device 9 is to be configured.

For example, if the power feeding coil L1 is configured so that one planar portion face one surface, on which the power receiving device 9 is to be configured, via the other planar portion (e.g., the case where the power receiving device 9 is configured via the surface S10 or S20), magnetic flux generated by the planar portion (herein, the other planar portion) opposite to S10 or S20 substantially contributes to a transmission of power to the power receiving device 9. As such, electric current generated in the power receiving coil L12 becomes smaller. On the contrary, according to the present embodiment, since magnetic flux generated by two planar portions contributes to transmission of power to the power receiving device 9, a power feeding device 11 having a surface capable of generating a larger current to the power receiving coil L2 can be provided.

Moreover, the configuration of the power feeding coil L1 is not limited to a configuration in which the power feeding coil L1 has a protruding portion projecting toward or projecting toward the opposite side of one surface (S40) on which the power receiving device 9 is to be configured, and includes, for example, a configuration which protrudes toward or protrudes toward the opposite side of the boundary portion between one surface (S40) on which the power receiving device 9 is to be configured and a surface (S10 or S20) which the power receiving device 9 is not to be configured on and is adjacent to the one surface (S40).

Further, the power feeding device 11 contacts with the power receiving device 9 via one surface S40, but not limited to only one surface, and can contact with the power receiving device 9 via a plurality of surfaces.

Hereinabove, although the power receiving portion 5 or the power feeding portion 3 is illustrated by using one embodiment of coil in the first to sixth embodiments, a combination of different shapes of coils can also be used. The shape of the coil is not particularly limited as long as an end face of at least one opening end of two opening ends is configured nonparallel to two or more surfaces of the power receiving device 9 or the power feeding device 11, and can be a shape other than that described in the above embodiments.

Figure 16:
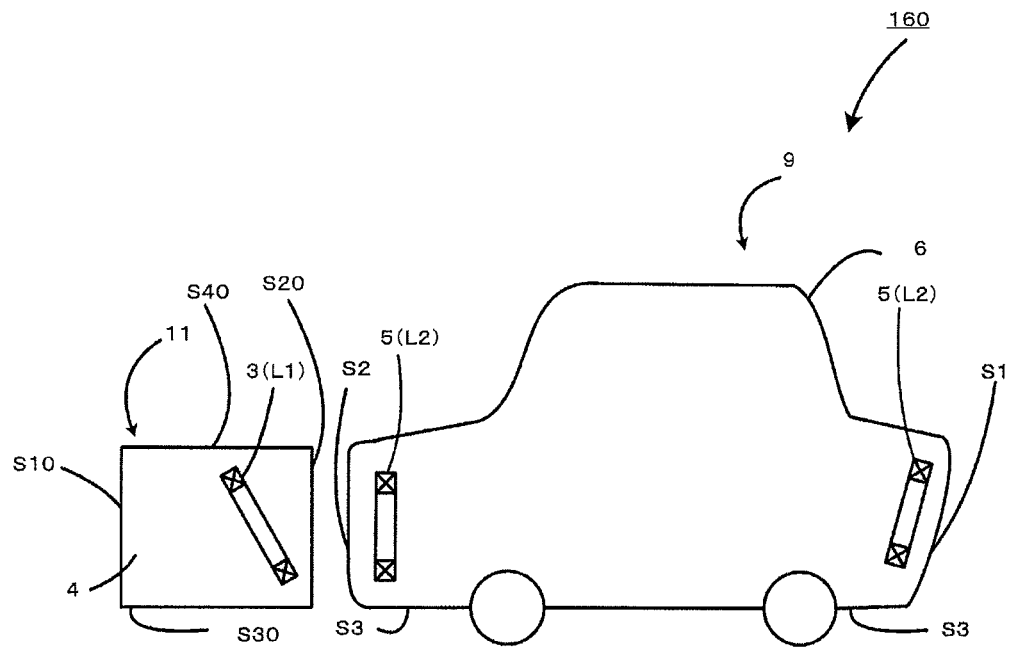
FIG. 16 is a cross-sectional view illustrating an embodiment in which the power feeding device of the present invention is a power feeding device for an electric vehicle.
Figure 17:
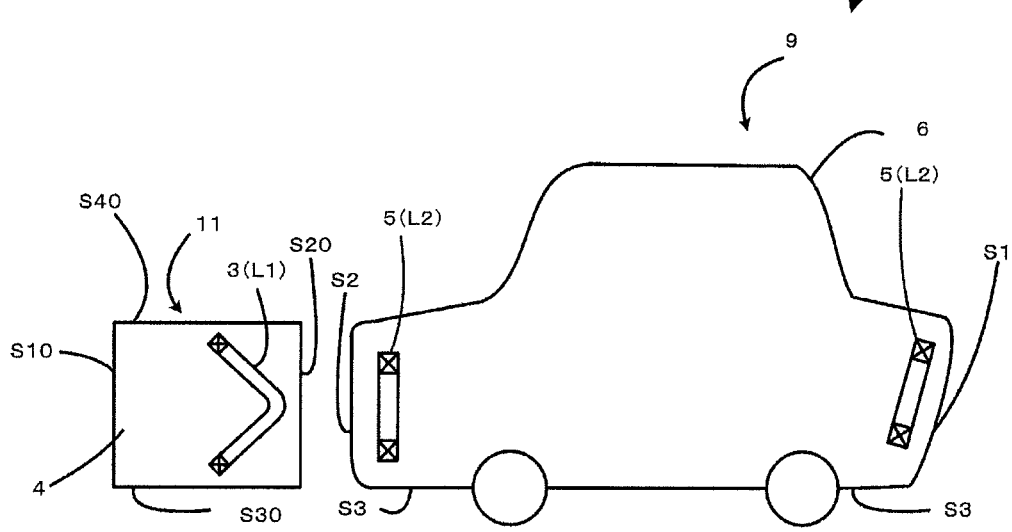
FIG. 17 is a cross-sectional view illustrating another embodiment in which the power feeding device of the present invention is a power feeding device for an electric vehicle.

In a case where the power receiving device 9 is a small-sized electronic machine such as a cellphone, one power feeding device 11 can charge a plurality of power receiving devices 9. Moreover, if the construction of the power feeding device 11 is applied to in-vehicle space in which small articles are placed inside, the small-sized electronic machines such as cellphones can be charged just by optionally placing them regardless of the configuration manner of the power receiving device. Moreover, even if there is limitation to the space, charging can be performed without limiting the configuring direction of the power receiving device 9 or the power feeding device 11. Use thereof is not limited hereto. As described later, the power receiving device 9 can be an electric vehicle (FIG. 14 and FIG. 15), or the power feeding device 11 can be a power feeding device for an electric vehicle (FIG. 16 and FIG. 17).

Figure 14:
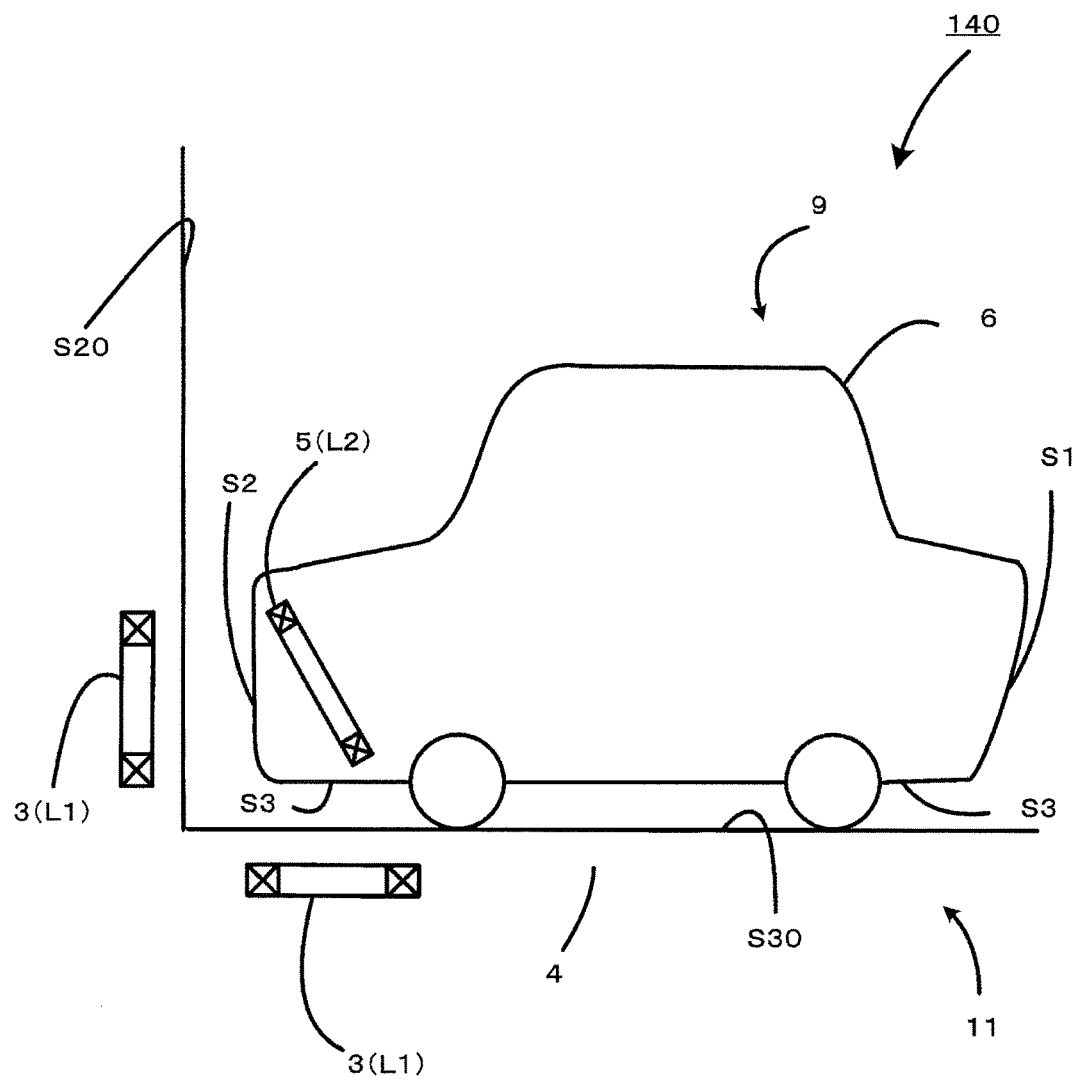
FIG. 14 is a cross-sectional view illustrating an embodiment in which the power receiving device of the present invention is an electric vehicle.

FIG. 14 is a cross-sectional view illustrating an embodiment in which the power receiving device of the present invention is an electric vehicle. A power receiving coil L2 is provided in front of an electric vehicle 9. The power receiving coil L2 comprises: a winding portion with wires wound; an opening portion surrounded by the winding portion and having two opposite opening ends, wherein an end face of at least one of the two opening ends is configured nonparallel (but not including perpendicular) to two surfaces S2 and S3 of the electric vehicle 9. As such, a power receiving area capable of receiving power from the power feeding device 11 is formed on the two surfaces S2 and S3 of the electric vehicle 9. Moreover, in the present embodiment, the power receiving coil L2 is a planar coil. According to the present embodiment, even if a planar power feeding coil L1 is provided along a bottom surface S30 of the power feeding device body portion 4 in the power feeding device 11, and even if a power feeding coil L1 is provided along a side surface S20 of the power feeding device body portion 4, the electric vehicle 9 can be charged.

Figure 15:
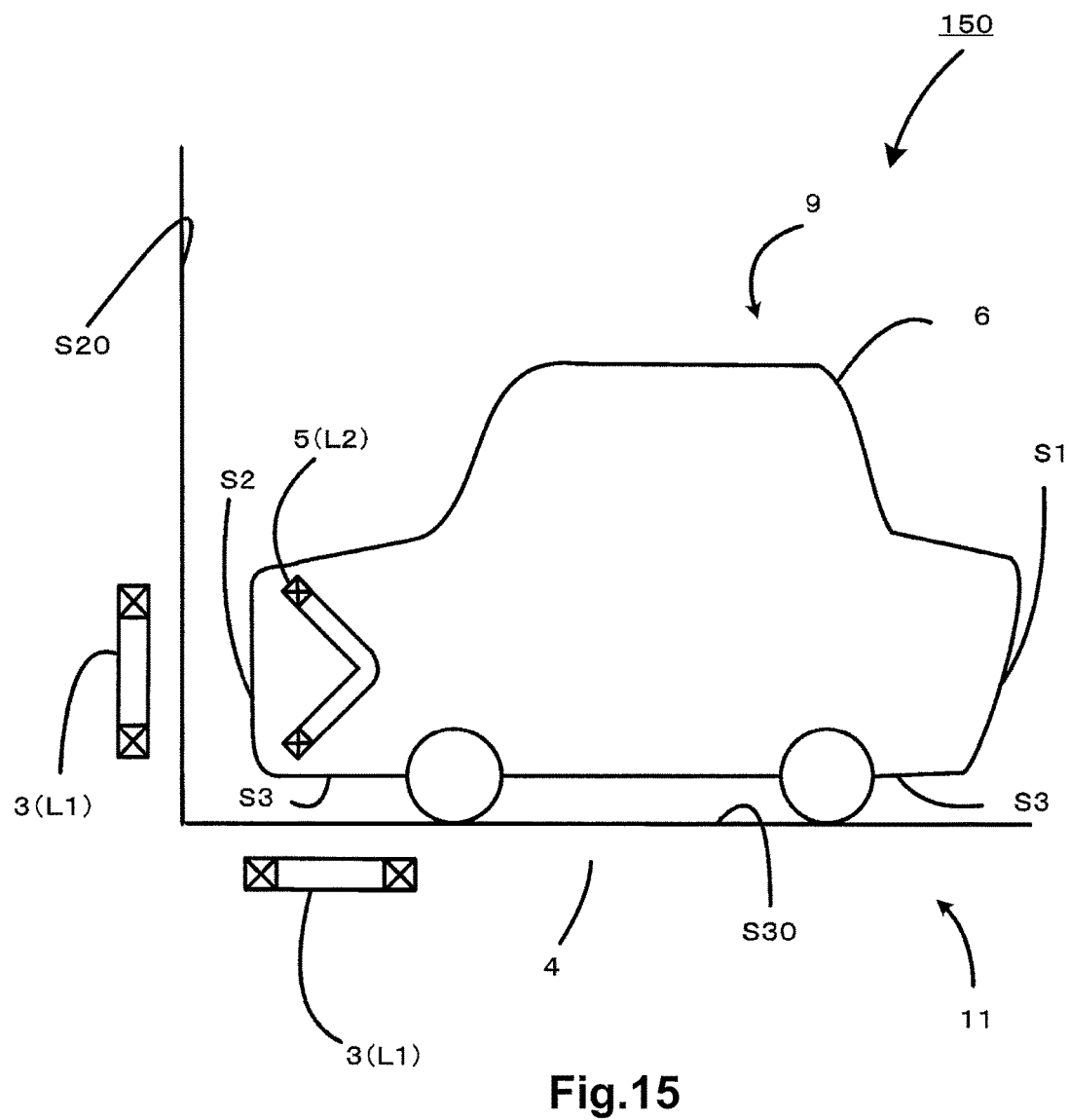
FIG. 15 is a cross-sectional view illustrating another embodiment in which the power receiving device of the present invention is an electric vehicle.

FIG. 15 is a cross-sectional view illustrating another embodiment in which the power receiving device of the present invention is an electric vehicle. A power receiving coil L2 is provided in front of an electric vehicle 9. The power receiving coil L2 is bent. The power receiving coil L2 of the present embodiment is obtained by bending the power receiving coil L2 of the above embodiment. According to the present embodiment, even if a planar power feeding coil L1 is provided along a bottom surface S30 of the power feeding device body portion 4 in the power feeding device 11, and even if a power feeding coil L1 is provided along a side surface S20 of the power feeding device body portion 4, the electric vehicle 9 can be charged. Furthermore, although the power receiving coil L2 of the present embodiment is bent, a curved power receiving coil L2 can achieve the same effect.

According to the above embodiments, the number of the power receiving coils L2 may be not increased, but the power feeding device 11 has freedom for configuration with respect to the electric vehicle 9. The power receiving coil L2 can be configured not only in front of but also in rear of the electric vehicle 9. In the latter case, the power receiving coil L2 can be configured along a bottom surface S3 and a rear surface S1. Moreover, in a case of configuring the power receiving coil L2 in front or rear of the electric vehicle 9, the power receiving coil L2 can be configured not only along a bottom surface S3 and a front surface S2 or a bottom surface S3 and a rear surface S1, but also along a bottom surface S3 and a side surface, which can achieve the same effect.

FIG. 16 is a cross-sectional view illustrating an embodiment in which the power feeding device of the present invention is a power feeding device for an electric vehicle. A power receiving coil L2 is provided in front of and in rear of an electric vehicle 9. The power feeding coil L1 comprises: a winding portion with wires wound; an opening portion surrounded by the winding portion and having two opposite opening ends, wherein an end face of at least one of the two opening ends is configured nonparallel (but not including perpendicular) to two or more surfaces of the power feeding device 11. As such, a power feeding area capable of transmitting power to the power receiving device 9 is formed on the two surfaces of the power feeding device 11. Moreover, in the present embodiment, the power feeding coil L1 is a planar coil. In a case of configuring devices that make the power feeding device 11 operate on a side surface S10 side, power can be supplied to the power receiving coil L2 from at least a side surface S20, a top surface S40, a bottom surface S30 of the power feeding device 11. For example, in a case where the power feeding device 11 is a device movable to the bottom of the electric vehicle 9, charging can be performed when the power receiving coil L2 of the electric vehicle 9 is provided not only in front or rear, but also at bottom of the vehicle.

FIG. 17 is a cross-sectional view illustrating another embodiment in which the power feeding device of the present invention is a power feeding device for an electric vehicle. The power feeding coil L1 is bent. The power feeding coil L1 of the present embodiment is obtained by bending the power feeding coil L1 of the above embodiment. According to the present embodiment, power can be supplied to the power receiving coil L2 from at least a side surface S20, a top surface S40, a bottom surface S30 of the power feeding device 11. Furthermore, although the power feeding coil L1 of the present embodiment is bent, a power feeding coil L1 which has a curved power receiving face can achieve the same effect.

According to the above embodiments, the number of the power feeding coil L1 may be not increased, but the power feeding device 11 has freedom for configuration with respect to the electric vehicle 9. Moreover, power feeding coil L1 can be configured not only along a side surface S20, a top surface S40 or a bottom surface S30, but also along other surfaces, which can achieve the same effect.

Hereinabove, although the preferable embodiments of the power receiving device and the power feeding device of the present invention are illustrated, the present invention is not limited hereto. Although either the power receiving device 9 or the power feeding device 11 uses a device which has a characteristic configuration of coils in the first to sixth embodiments, a wireless power transmission device can be constructed by combination of the power receiving device 9 of the first to third embodiments and the power feeding device 11 of the fourth to sixth embodiments.

Variant Embodiment

Although the power receiving portion 5 or the power feeding portion 3 uses a coil in the above embodiments, an electrode can be used instead of the coil. Hereinafter, a case where an electrode is used instead of the coil is simply illustrated. Moreover, description repeated with that in the first to sixth embodiments is omitted.

Figure 18:
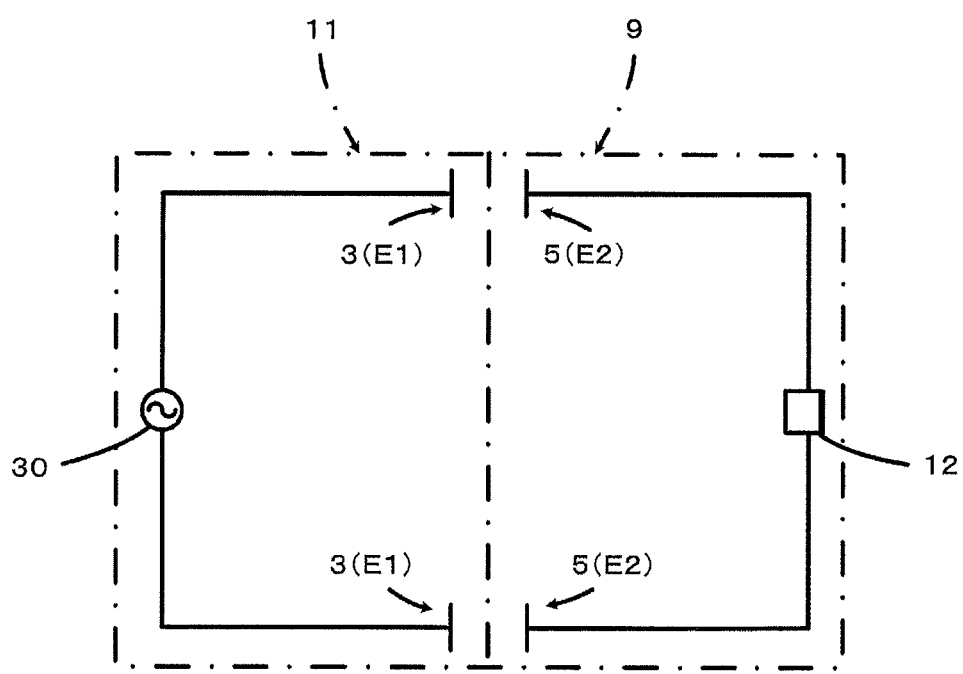
FIG. 18 is a schematic view illustrating another example of the coupling manner of the power feeding portion and the power receiving portion.

FIG. 18 is a schematic diagram illustrating another example of the coupling manner of the power feeding portion 3 and the power receiving portion 5. In the power feeding device 11, charges are accumulated in a power feeding electrode E1 by flowing current obtain from the alternating current power source 30 into the power feeding electrode E1. The power receiving device 9 is configured adjacent with the power feeding device 11 in such a manner that the power receiving electrode E2 and the power feeding electrode E1 are opposite to each other, and charges are induced in the power receiving electrode E2 by the charges accumulated in the power feeding electrode E1. A rectifier 12 rectifies the generated current, thereby supplying power to the power receiving device 9. The intensity of the electric filed generated in the power feeding electrode E1 varies depending on magnitude of current flowing into the power feeding electrode E1, size of the opposing surfaces toward the power receiving electrode E2 of the power feeding electrode E1 and the power receiving electrode E2, distance from the opposing surface of the power receiving electrode E2 and the like. Moreover, electric energy induced in the charging electrode E2 varies depending on intensity of electric filed generated in the power feeding electrode E1, size of the opposing surfaces toward the power feeding electrode E1 of the power receiving electrode E2, distance from the opposing surface of the power feeding electrode E1 and the like. The above parameters such as current flowing into the power receiving electrode E1 and the power feeding electrode E2 are adjusted to supply an appropriate amount of power to the power receiving device 9.

(Power Receiving Device)

The power receiving device 9 of the present variant embodiment is a power receiving device 9 which transmits power wirelessly by a power feeding device comprising two or more power feeding electrodes E1. The power receiving device 9 has a plurality of surfaces, and include inside two or more power receiving electrodes E2. The power receiving electrode E2 has a power receiving face formed by conductors. At least one of the power receiving electrodes E2 is configured such that the power receiving face of the power receiving electrode is face to face with at least one surface of the power receiving device 9. At least one of the power receiving electrodes other than the above power receiving electrode E2 is configured such that the power receiving face of the power receiving electrode E2 is nonparallel to two or more surfaces of the power receiving device 9, wherein a power receiving area capable of receiving power from the power feeding device 11 is formed on the two or more surfaces of the power receiving device 9. Herein, the "the power receiving face of the power receiving electrode" refers to the "surface of the electrode that has the largest area".

In the power receiving device 9 of the variant embodiment, by combining at least one power receiving electrode E2 configured nonparallel to two or more surfaces of the power receiving device 9, with at least one power receiving electrode E2 in face to face with at least one surface of the power receiving device 9, the power receiving device 9 can be electrically coupled with the power feeding device 11 through the two or more surfaces of the power receiving device 9. Therefore, wirings connecting to the power receiving electrode E2 and the like can be simplified and the number of the control devices can be reduced, as compared with a case where one surface of the power receiving device 9 becomes a surface for receiving power with respect to the power receiving face of one power receiving electrode E2, and where a plurality of power receiving electrodes E2 are used and a plurality of surfaces of the power receiving device 9 become the surfaces for receiving power. Moreover, when the power feeding area of the power feeding device 11 is a specific portion, the power receiving device can also have freedom for configuration to transmit electricity.

(Power Feeding Device)

The power feeding device 11 of the present variant embodiment is a power feeding device 11 which transmits power wirelessly to the power receiving device 9 comprising two or more power receiving electrode E2. The power feeding device 11 has a plurality of surfaces, and include inside two or more power feeding electrode E1.

The power feeding electrode E1 has a power feeding face formed by conductors. At least one of the power feeding electrodes E1 is configured such that the power feeding face of the power feeding electrode E1 is face to face with at least one surface of the power feeding device 11. At least one of the power feeding electrode E1 other than the above power feeding electrode E1 is configured such that the power feeding face of the power feeding electrode E1 is nonparallel to two or more surfaces of the power feeding device 11, wherein a power feeding area capable of transmitting power to the power receiving device 9 is formed on the two or more surfaces of the power feeding device 11. Herein, the "the power feeding face of the power feeding electrode" refers to the "surface of the electrode that has the largest area".

In the power feeding device 11 of the variant embodiment, by combining at least one power feeding electrode E1 configured nonparallel to two or more surfaces of the power feeding device 11, with at least one power feeding electrode E1 in face to face with at least one surface of the power feeding device 11, the power feeding device 11 can be electrically coupled with the power receiving device 9 through the two or more surfaces of the power feeding device 11. Therefore, the power feeding device 11 can be electrically coupled with the power receiving device 9 through a plurality of surfaces with respect to the power feeding face of one power feeding electrode E1. Hence, wirings connecting to the power feeding electrode E1 and the like can be simplified and the number of the control devices can be reduced, as compared with a case where one surface of the power feeding device 11 becomes a surface for supplying power with respect to the power feeding face of one power feeding electrode E1, and where a plurality of power feeding electrode E1 are used and a plurality of surfaces of the power feeding device 11 become the surfaces for receiving power. Moreover, when the power receiving area of the power receiving device 9 is a specific portion, the power feeding device 11 can also have freedom for configuration to transmit electricity.

In a case where the power feeding electrode E1 and the power receiving electrode E2 have a planar shape, a shape that can sufficiently ensure the area of the power feeding face of the power feeding electrode E1 or the power receiving face of the power receiving electrode E2 are preferred, such as a sheet-like shape or a plate-like shape. Sheets or plates with a square shape, a rectangle shape, a polygon having five or more corners, a round shape, an ellipse shape can be used. In a case of a curved shape, a bent shape or the like, the above sheet-like and plate-like electrodes can be curved into an arc shape or bent, and electrodes with a curved shape or a bent shape such as a L-shape, a U-shape, or the like are used. Moreover, various electrodes with different shapes can be combined. The power feeding electrode E1 and the power receiving electrode E2 can be formed from a metal plate, a metal foil, metal wires, and the like.

The distance between the opposing surfaces of the power feeding electrode E1 and the power receiving electrode E2 is not particularly limited as long as the power receiving device 9 can be provided with an appropriate amount of power. From the viewpoint of power transmission efficiency, the distance can be shortened.

By coupling electric fields of the power feeding electrode E1 and power receiving electrode E2, power can be transmitted from the power feeding device 11 to the power receiving device 9. Even if the power receiving device 9 or the power feeding device 11 is rotated, by making the power feeding electrode E1 and the power receiving electrode E2 opposite to each other via surfaces other than the surface S3 or S40, power can be supplied through electric coupling of electric fields of the power feeding electrode E1 and power receiving electrode E2. That is, according to the wireless power transmission system utilizing the power receiving device 9 or the power feeding device 11 of the present variant embodiment, even if not using a plurality of power feeding electrodes E1 or power receiving electrodes E2 for supplying power via a plurality of surfaces of the power receiving device 9 or the power feeding device 11, only one power feeding electrode E1 or power receiving electrode E2 can allow the power receiving device 9 or the power feeding device 11 to have freedom for configuration to supply power.

Moreover, as compared with a case of using a plurality of electrodes as the power feeding electrode E1 and power receiving electrode E2, the number of the wirings leaded out from the electrodes, the number of the control devices connecting to the wirings, etc. can be reduced and the size of the power receiving device 9 or the power feeding device 11 is not limited by these conditions.

DESCRIPTION OF REFERENCE NUMERALS 1, 40, 60, 80, 100, 120 . . . wireless power transmission device; 3 . . . power feeding portion; 4 . . . power feeding device body portion; 5 . . . power receiving portion; power receiving device body portion; 8 . . . resin; 9 . . . power receiving device; 10 . . . power receiving portion package; 11 . . . power feeding device; 12 . . . rectifier; 13 . . . load device; 14 . . . drive circuit; 15 . . . battery; 30 . . . alternating current; 50 . . . power feeding portion package; 31,51 . . . winding portion; 32, 52 . . . opening portion; L1 . . . power feeding coil; L2 . . . power receiving coil; S1, S2, S3, S4, S5, S6 . . . surface of power receiving device; S10, S20, S30, S40, S50, S60 . . . surface of power feeding device; s1, s10 . . . end face of first opening end; s2, s20 . . . end face of second opening end.

What is claimed is:

1. A power receiving device to which power is transmitted wirelessly from a power feeding device comprising a power feeding coil, the power receiving device comprising:
   a plurality of outer surfaces;
   a power receiving area that is capable of receiving power from the power feeding device and is formed on two or more of the plurality of outer surfaces; and
   a power receiving coil inside the plurality of outer surfaces, the power receiving coil comprising:
      a winding portion, having:
         wound wires;
         two bent portions; and
         two planar portions that connect the two bent portions; and
      a bent opening portion surrounded by the winding portion, the bent opening portion having:
         a bent planar shape resulting from a shape of the winding portion; and
         two planar portions resulting from the shape of the winding portion, one of the two planar portions being not parallel and not perpendicular to any of the two or more outer surfaces on which the power receiving area is formed.

2. The power receiving device according to claim 1, wherein one of the two bent portions projects toward one of the plurality of outer surfaces, on which the power feeding device is to be disposed.

3. The power receiving device according to claim 1, wherein one of the two bent portions projects toward an opposite side of one of the plurality of outer surfaces, on which the power feeding device is to be disposed.

4. A power feeding device which transmits power wirelessly to a power receiving device comprising a power receiving coil, the power feeding device comprising:
   a plurality of outer surfaces;
   a power feeding area that is capable of transmitting power to the power receiving device and is formed on two or more of the plurality of outer surfaces; and
   a power feeding coil inside the plurality of outer surfaces, the power feeding coil comprising:
      a winding portion, having:
         wound wires;
         two bent portions; and
         two planar portions that connect the two bent portions; and
      a bent opening portion surrounded by the winding portion, the bent opening portion having:
         a bent planar shape resulting from a shape of the winding portion; and
         two planar portions resulting from the shape of the winding portion, one of the two planar portions being not parallel and not perpendicular to any of the two or more outer surfaces on which the power feeding area is formed.

5. The power feeding device according to claim 4, wherein one of the two bent portions projects toward one of the plurality of outer surfaces, on which the power receiving device is to be disposed.

6. The power feeding device according to claim 4, wherein one of the two bent portions projects toward an opposite side of one of the plurality of outer surfaces, on which the power receiving device is to be disposed.

* * * * *